(12) United States Patent
Barker

(10) Patent No.: US 11,517,011 B1
(45) Date of Patent: Dec. 6, 2022

(54) FLOATING WATERFOWL DECOY CONVERTER

(71) Applicant: Wesley S. Barker, Bothell, WA (US)

(72) Inventor: Wesley S. Barker, Bothell, WA (US)

( * ) Notice: Subject to any disclaimer, the term of this patent is extended or adjusted under 35 U.S.C. 154(b) by 0 days.

(21) Appl. No.: 17/832,621

(22) Filed: Jun. 4, 2022

Related U.S. Application Data

(63) Continuation-in-part of application No. 17/746,476, filed on May 17, 2022.

(51) Int. Cl.
| | | |
|---|---|---|
| *A01M 31/06* | (2006.01) | |
| *F16M 11/04* | (2006.01) | |
| *F16M 13/02* | (2006.01) | |

(52) U.S. Cl.
CPC .......... *A01M 31/06* (2013.01); *F16M 11/041* (2013.01); *F16M 13/02* (2013.01)

(58) Field of Classification Search
CPC .. A01M 31/06; A01M 2200/00; A01M 29/06; F16M 11/041; F16M 13/02
USPC .................. 43/2, 3; 248/121; 274.1
See application file for complete search history.

(56) References Cited

U.S. PATENT DOCUMENTS

| | | | |
|---|---|---|---|
| 3,736,688 A | | 6/1973 | Caccamo |
| 4,435,913 A | * | 3/1984 | Messina ................. A01M 31/06 43/3 |
| 10,440,946 B2 | | 10/2019 | Brooks |
| 2005/0268522 A1 | * | 12/2005 | Foster .................... A01M 31/06 43/3 |
| 2009/0249678 A1 | | 10/2009 | Arnold |
| 2011/0239517 A1 | * | 10/2011 | Gazalski ............... A01M 31/06 43/3 |
| 2013/0111800 A1 | * | 5/2013 | Pifer ..................... A01M 31/06 43/3 |
| 2014/0332645 A1 | | 11/2014 | Brooks |
| 2018/0125062 A1 | * | 5/2018 | Brooks .................. F16M 13/02 |

OTHER PUBLICATIONS

"How to Make Dual-Purpose Duck Decoys," outdoorlife.com. https://www.outdoorlife.com/articles/hunting/2015/04/how-make-dual-purpose-duck-decoys/ [Date accessed: Jan. 5, 2021].

(Continued)

*Primary Examiner* — Jack W Keith
*Assistant Examiner* — Jeffrey R Larsen
(74) *Attorney, Agent, or Firm* — Houda El-Jarrah; Bold IP, PLLC

(57) ABSTRACT

A waterfowl decoy converter system is disclosed. The waterfowl decoy converter system enables floating waterfowl decoys normally used to float in bodies of water to be converted for use in a field setting or attached to a ground surface to attract and lure waterfowl. The system includes a keel adapter assembly that is adjustable in height and is usable to hold a variety of waterfowl decoys even if the keels of the decoys have different shapes and sizes. A keel adapter assembly fits around the keel of the decoy which is then positioned within a keel trench, and the keel trench is attached to a stake that can be mounted where needed. The system allows for wind powered swivel motion and movement of the decoy when positioned on top of the decoy converter over a limited range of degrees to ensure realistic movement of the decoy.

20 Claims, 12 Drawing Sheets

(56) References Cited

OTHER PUBLICATIONS

"Duck Pole Decoy Conversion Stand," ridgedepot.com. https://ridgedepot.com/products/duck-pole-decoy-conversion-stand [Date accessed: Nov. 25, 2020].
"G&H Decoys Transformer Adapter Orange," marshmutt.com https://www.marshmutt.com/product/gh-decoys-transformer-adapter-orange/ [Date accessed: Nov. 25, 2020].

* cited by examiner

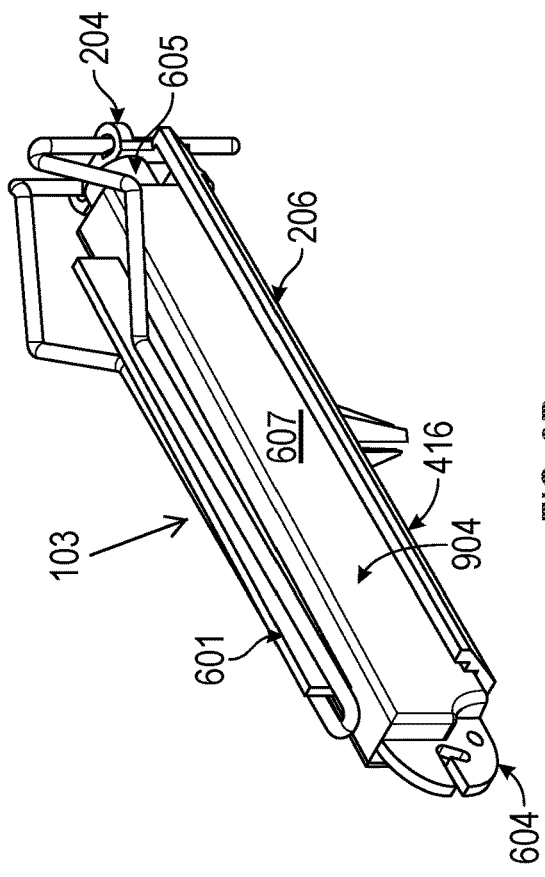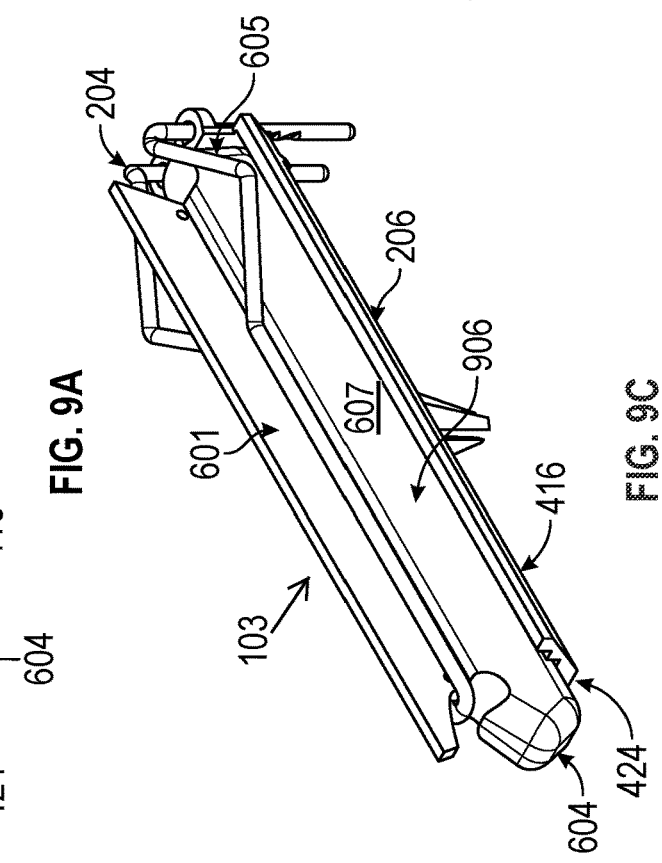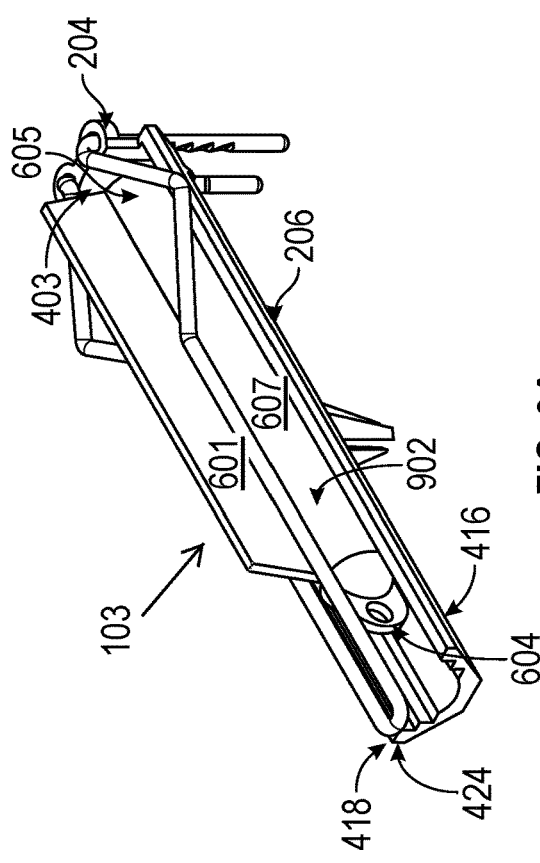

FLOATING WATERFOWL DECOY CONVERTER

CROSS-REFERENCE TO RELATED APPLICATIONS

This application is a continuation in part application of non-provisional application Ser. No. 17/746,476, which was filed on May 17, 2022, which claims priority to U.S. Provisional Patent Application No. 63/191,191 filed on May 20, 2021, all of which is incorporated in their entirety.

FIELD OF THE DISCLOSURE

The present invention relates to a new system and method to enable floating waterfowl decoys normally used to float in bodies of water to be converted for use in a field and/or mounted on a stake on a ground surface or an underwater ground surface of a body of water. In a non-limiting embodiment, the converted floating waterfowl decoy that is usable as a field decoy may also be enabled to have wind powered swivel motion and movement of the decoy when positioned on top of the decoy converter.

BACKGROUND

Waterfowl decoys are one of the largest expenses and investments required for successful duck or goose hunts and/or observing waterfowl for scientific or research purposes or personal entertainment. The primary form of expenses for such users is in purchasing equipment, including, purchasing a variety of decoys to attract the waterfowl to specific locations in order to hunt them or to observe them and/or otherwise engage with them. There are two primary types of decoys. Decoys that float on water are known as floating decoys and decoys that are staked into a ground surface are known as field decoys. The appropriate type of decoy is dependent on the weather, time of year, location for hunting, research variables, or other purpose for engaging with the waterfowl. A half dozen quality decoys can easily cost over $100 making it cost prohibitive for many hunters and other users to purchase both floating and field decoys. The ability to convert floating decoys to field decoys will provide the hunter and other users with the opportunity to hunt or otherwise engage with the waterfowl in additional locations at an affordable price and help reduce the amount of equipment a hunter or other users have to buy, store, and carry.

Accordingly, there is a need for an alternative to the existing decoys used for hunting, observing, and/or otherwise engaging with waterfowl, such as, but not limited to, duck and/or geese.

SUMMARY

A system for a floating waterfowl decoy converter is described according to one or more non-limiting embodiments, the system comprising a keel adapter assembly for holding a keel of a floating waterfowl decoy in a keel trench. In a non-limiting embodiment, the keel adapter assembly comprises a first bar that is parallel to a second bar, wherein a first end of the first bar is joined with a connecting piece to a first end of the second bar, wherein a first gap exists between the first bar and the second bar. The keel adapter assembly further comprises a first back piece, wherein a first end of the first back piece is joined with a second end of the first bar and a a second back piece, wherein a first end of the second back piece is joined with a second end of the second bar. A second gap exists between the first back piece and the second back piece. The keel adapter assembly further comprises a first vertical rod coupled to a second end of the first back piece and a second vertical rod coupled to a second end of the second back piece, wherein the first vertical rod is parallel to the second vertical rod, wherein the first vertical rod and the second vertical rod each comprise a set of teeth spaced apart in a vertical direction on the first vertical rod and the second vertical rod.

The system further comprises a keel trench, wherein the keel adapter assembly is configured to be removably coupled to the keel trench. In a non-limiting embodiment, the keel trench comprises a raised ridge comprising a first platform and a second platform on a top surface of the raised ridge, wherein the first platform has a first opening and the second platform has a second opening, wherein the first opening is configured to receive the first vertical rod of the keel adapter assembly, and wherein the second opening is configured to receive the second vertical rod of the keel adapter assembly. Notably, a height of the keel adapter assembly is adjustable by adjusting how far down the first vertical rod and the second vertical rod of the keel adapter assembly are pushed down into the first opening and the second opening, respectively, of the raised ridge of the keel trench, wherein the set of teeth on each of the first vertical rod and of the second vertical rod of the keel adapter assembly are configured to temporarily lock a position of the first vertical rod and the second vertical rod of the keel adapter assembly to set the keel adapter assembly at a desired height above the keel trench. The keel trench further comprises a trench body, wherein the trench body is coupled to the raised ridge, wherein the trench body comprises a first raised sidewall and a second raised sidewall, wherein the first raised sidewall and the second raised sidewall encompass a lower trench surface defined by the first raised sidewall and the second raised sidewall, and wherein the trench body of the keel trench further comprises a set of prongs that protrude from an underside of the trench body of the keel trench.

In a non-limiting embodiment, the system further comprises a stake, wherein the stake comprises an elongated upright pole having a top end and a pointed end at a terminal end of the elongated upright pole. In a non-limiting embodiment, the set of prongs of the keel trench are configured to grip onto and over the top end of the stake or to alternatively fit within an opening within the top end of the stake. In a non-limiting embodiment, the stake further comprises a protruding piece that is joined to a side of the top end of the stake, wherein the set of prongs of the trench body of the keel trench fit over the top end and also over the protruding piece of the stake. In a non-limiting embodiment, the protruding piece limits a degree of rotational movement of the keel trench when the keel trench is coupled to the top end of the stake.

In a non-limiting embodiment, the first backpiece and the second backpiece each comprise a first backpiece bar that is angled in a first direction and a second backpiece bar that is angled in a second direction away from the first backpiece bar wherein together the first backpiece bar and the second backpiece bar form a general V-shape. Accordingly, the first back piece and the second back piece are symmetrical and face towards each other with the second gap spanning between the first back piece and the second back piece. In a non-limiting embodiment, the connecting piece is a curved connecting piece that joins the first end of the first bar to the first end of the second bar of the keel adapter assembly.

Further, in a non-limiting embodiment, the first raised sidewall and the second raised sidewall of the trench body of the keel trench have a stepped design leading down to the lower trench surface between the first raised sidewall and the second raised sidewall, and the front end of the keel trench is open ended, wherein the front end of the keel trench is on an opposite side from the raised ridge of the keel trench.

In a non-limiting embodiment, the set of teeth on each of the first vertical rod and the second vertical rod of the keel adapter assembly face inward towards a back side of the raised ridge of the keel trench in order for a tooth of the set of teeth on each of the first vertical rod and the second vertical rod to grip a bottom edge of the raised ridge to temporarily lock the keel adapter assembly in place. Further, when the keel adapter assembly is removably coupled to the keel trench, a floating waterfowl decoy is insertable into the keel trench, wherein a top piece of the keel of the floating waterfowl decoy fits between the first bar and the second bar of the keel adapter assembly, wherein a body of the keel of the floating waterfowl decoy fits between the first raised sidewall and the second raised sidewall of the keel trench, and wherein a back side of the keel of the floating waterfowl decoy contacts or stops before an interior facing surface of the raised ridge of the keel trench.

In a non-limiting embodiment, a method of using a floating waterfowl decoy converter to convert a floating waterfowl decoy for use as a field waterfowl decoy is presented herein. The method comprises providing the floating waterfowl decoy converter as described above having a keel adapter assembly, a keel trench, and/or a stake in one or more non-limiting embodiments. The method further comprises coupling the keel adapter assembly to the keel trench further comprising inserting the first vertical rod of the keel adapter assembly into the first opening of the raised ridge of the keel trench and then inserting the second vertical rod of the keel adapter assembly into the second opening of the raised ridge of the keel trench. The method further comprises temporarily locking the first vertical rod of the keel adapter assembly in place within the first opening of the raised ridge of the keel trench by pushing a first tooth of the set of teeth on the first vertical rod against a bottom edge of the raised ridge of the keel trench and temporarily locking the second vertical rod of the keel adapter assembly in place within the second opening of the raised ridge of the keel trench by pushing a first tooth of the set of teeth on the second vertical rod against the bottom edge of the raised ridge of the keel trench.

The method may further comprise selecting the floating waterfowl decoy, the floating waterfowl decoy comprising a keel attached to an underside of a body of the floating waterfowl decoy, the keel comprising a keel front side, a keel body, and a keel back side. The method may further comprise holding the floating waterfowl decoy over the keel adapter assembly coupled to the keel trench and angling the keel front side of the floating waterfowl decoy in a downward direction and inserting the keel front side of the floating waterfowl decoy into the second gap between the first backpiece and the second backpiece of the keel adapter assembly. The method may further comprise pushing the keel body of the floating waterfowl decoy into the trench body of the keel trench, wherein the keel body of the floating waterfowl decoy is contained between the first raised sidewall and the second raised sidewall of the keel trench and selectively adjusting a height of the keel adapter assembly coupled to the keel trench. The method may further comprise securing the stake into a desired spot on a ground surface or into an underwater ground surface of a body of water, further comprising inserting the pointed end of the stake into the ground surface or the underwater ground surface and pushing the set of prongs of the keel adapter assembly onto the top end of the stake while the keel adapter assembly is coupled to the keel trench and while the floating waterfowl decoy is contained within the keel adapter assembly and the keel trench. Accordingly, in a non-limiting embodiment the floating waterfowl decoy is converted for use as the field waterfowl decoy upon connecting the set of prongs to the stake.

In the steps of the method as described above, the step of selectively adjusting a height of the keel adapter assembly coupled to the keel trench may further comprise applying a first upward force on the first vertical rod to dislodge the first tooth of the first vertical rod from the bottom edge of the raised ridge, applying the first upward force on the second vertical rod to dislodge the first tooth of the second vertical rod from the bottom edge of the raised ridge, ensuring that the first tooth of the first vertical rod and the tooth of the second vertical rod clear the bottom edge of the raised ridge, and then continuing to pull upward on the keel adapter assembly until the first vertical rod and the second vertical rod pass upwardly through the first opening and the second opening, respectively, of the raised ridge. Further, this step may include selecting a second tooth on the first vertical rod and a second tooth on the second vertical rod and reinserting the first vertical rod through the first opening of the raised ridge and reinserting the second vertical rod through the second opening of the raised ridge, and pushing the second tooth of the first vertical rod and the second tooth of the second vertical rod against the bottom edge of the raised ridge of the keel adapter assembly until a desired height is achieved.

In the method described above, in one aspect, the floating waterfowl decoy remains positioned within the keel adapter assembly as coupled to the keel trench while selectively adjusting the height of the keel adapter assembly. Further, in the method described above, in one aspect, the keel front side of the floating waterfowl decoy is positioned ahead of or behind a front side of the keel trench, wherein the front side of the keel trench is open. Further, the keel back side of the floating waterfowl decoy contacts or is positioned proximate to an interior facing surface of the raised ridge of the keel trench.

Notably, in one or more non-limiting embodiments, the keel adapter assembly and the keel trench are configured to receive different floating waterfowl decoys having different sizes and shapes for the keel body, the keel front side, and/or the keel back side. Further, in one or more non-limiting embodiments, the method may include stacking multiple keel trenches together for storage purposes, wherein a set of prongs of a first keel trench are insertable into cutouts formed in a top side of a lower trench surface of a second keel trench.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 9A is a pictorial illustration showing a first example of a keel of a floating waterfowl decoy.

FIG. 9B is a pictorial illustration showing a second example of a keel of a floating waterfowl decoy.

FIG. 9C is a pictorial illustration showing a third example of a keel of a waterfowl decoy.

FIG. 9D is a pictorial illustration showing a fourth example of a keel of a waterfowl decoy.

DETAILED DESCRIPTION

The present description is drawn to a decoy converter that can be used to convert a floating decoy to a field decoy. In one or more non-limiting embodiments, when used for hunting, the floating decoy may be a hunting decoy purchased by hunters of ducks and geese and other waterfowl. The floating decoy may include a keel for floating on a body of water. The decoy converter allows a hunter or other user to position the keel in a keel trench of the decoy converter in order to allow the user to use the original floating decoy in a field setting. The decoy converter includes many advantages and benefits, including the ability to accommodate different sized keels on a floating decoy and the ability to swivel over a limited range of motion to impart a realistic sense of movement for the decoy when positioned on the decoy converter. The decoy converter may allow the user to save money on expenditures for equipment, including decoys and to minimize equipment that has to be taken with them on a hunt, waterfowl watching expedition, and/or otherwise used. Additional details are provided with respect to the Figures.

Figure 1A:
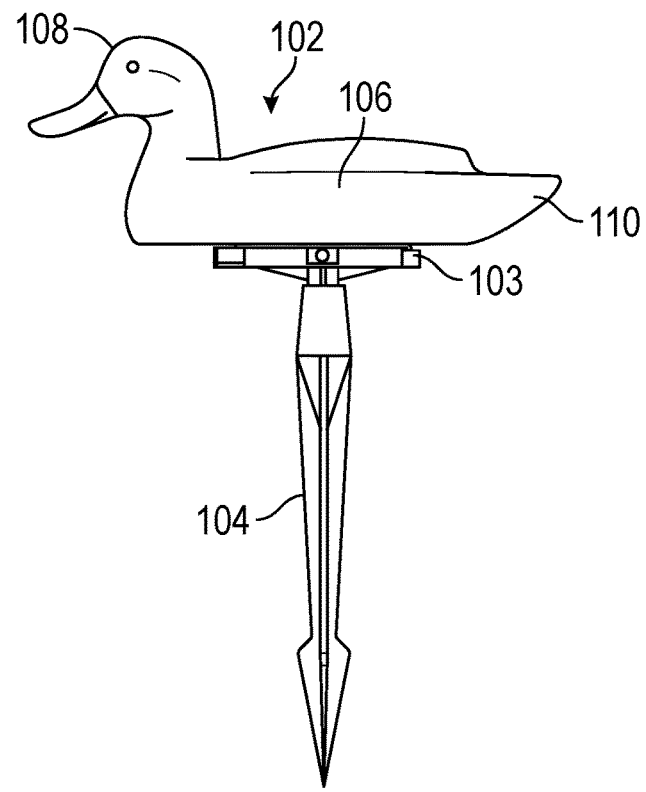
FIG. 1A depicts a pictorial illustration of a side view of a decoy on a first exemplary decoy converter.
Figure 1B:
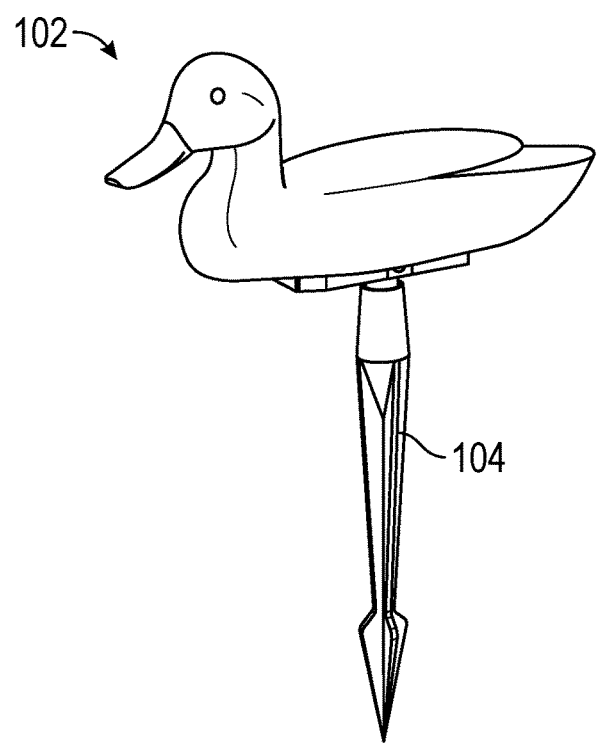
FIG. 1B depicts a pictorial illustration of a front perspective view of the decoy on the first exemplary decoy converter as shown in FIG. 1A.

FIG. 1A and FIG. 1B show an example of a floating decoy 102 that is inserted and detachably held in place in a designated position on a first example decoy converter 104. It is noted that the floating decoy 102 may also be inserted and detachably held in place in a designated position in the second example decoy converter 202 shown in FIG. 2-FIG. 10.

The term "decoy" as used herein may interchangeably be used with the term "hunting decoy," but there may be various reasons why a floating decoy, such as floating decoy 102 may be used. In many instances, hunters may utilize floating decoys 102 to attract a duck, goose, or other waterfowl for hunting purposes. Other times, the floating decoys 102 may be used to attract ducks, goose, or other waterfowl for scientific or recreational observational purposes or waterfowl watching expeditions so that a user can closely watch and observe any ducks, geese, and waterfowl in their natural habitats and/or otherwise capture them and engage with them. It is noted that the floating decoy 102 and decoy converter 104 as shown in FIGS. 1A-1B and/or decoy converter 202 as shown in FIGS. 2-10 may be used for any reason without limitation to hunting.

The first exemplary decoy converter 104 as shown in FIGS. 1A-1B and the second example decoy converter 202 may usefully allow a user or hunter to have a floating decoy 102 and use the floating decoy 102 as a field decoy that can be inserted into any ground surface, whether the ground surface is underwater in a body of water or otherwise. There may be instances where the user or hunter wants to make the floating decoy 102 appear to be raised out of a body of water and may want to use the stake portion of the first example decoy converter 104 and the stake portion 208 of the second example decoy converter 202 as shown in FIGS. 2-10 to raise the floating decoy 102 out of a body of water (or just raised on a field or ground surface).

The floating decoy 102 may be a type of decoy used to attract any type of waterfowl including, but not limited to, ducks and geese. A user may use floating decoy 102 as a decoy that looks like the waterfowl the user is hoping to attract, whether for hunting or watching and observation purposes or for any reason. The floating decoy may include a body 106, head 108, and tail 110 made to appear similar to any desired type of waterfowl, such as, but not limited to ducks and geese. The floating decoy 102 is configured to be removably attachable to a top of a decoy converter 104.

Notably, floating decoys, such as floating decoy 102, usually include what is known in the art as a "keel." An exemplary keel 103 is shown in FIG. 1A. Other exemplary keels 103 are also shown in FIG. 6B-6D, FIG. 6F and FIG.

9A-9D. A "keel" as known in the art may be a horizontal, elongated member located on the underside that is centrally located on the underside of the waterfowl decoy 102. The function of the keel 103 is to anchor and stabilize the floating decoy 102 when floating on and in a body of water. Keel 103 may be made of wood in some instances and/or may include a weight and serve as a weighted keel in other instances. The keel 103 may also be attached to a line that can be pulled by the user to manipulate and move the keel 103 and attached floating decoy 102 in the water. The keel 103 enables floating on the body of water by the floating decoy 102 and enables realistic floating movement in a body of water to attract other waterfowl via the floating decoy 102.

As noted above, purchasers of field decoys (not shown) also often purchase floating decoys 102, which are intended for use in bodies of water where waterfowl may be located and to which they may be attracted. The user places the floating decoy 102 in the body of water either to float on its own or as attached to a line that can be pulled back to the user, and the user may then hide so as to wait and see if any waterfowl are attracted to approach or come near to the floating decoy 102. Floating decoys 102 are designed to float but not to stand upright on their own accord without additional devices to a ground surface. Floating decoys 102, in this sense, are different from field decoys (not shown) which typically have legs or posts or other types of members that allow the field decoy to stand on its own on a field or ground surface.

Because a hunter or other user may want to have a decoy that is not floating in water, it may be useful to have a field decoy. The first example decoy converter 104 shown in FIGS. 1A-1B and the second example decoy converter 202 shown in FIGS. 2-10 allow the user to take the same floating decoy 102 that is configured to float on a body of water and removably couple the floating decoy 102 to the first example decoy converter 104 or the second example decoy converter 202 and insert the pointed end (e.g., pointed end 204 as shown in FIG. 2 of the decoy converter 104 or pointed end 508 shown in FIG. 5 and in FIG. 6E) into a ground surface so that the floating decoy 102 essentially serves as a field decoy that is staked in the ground.

Figure 2:
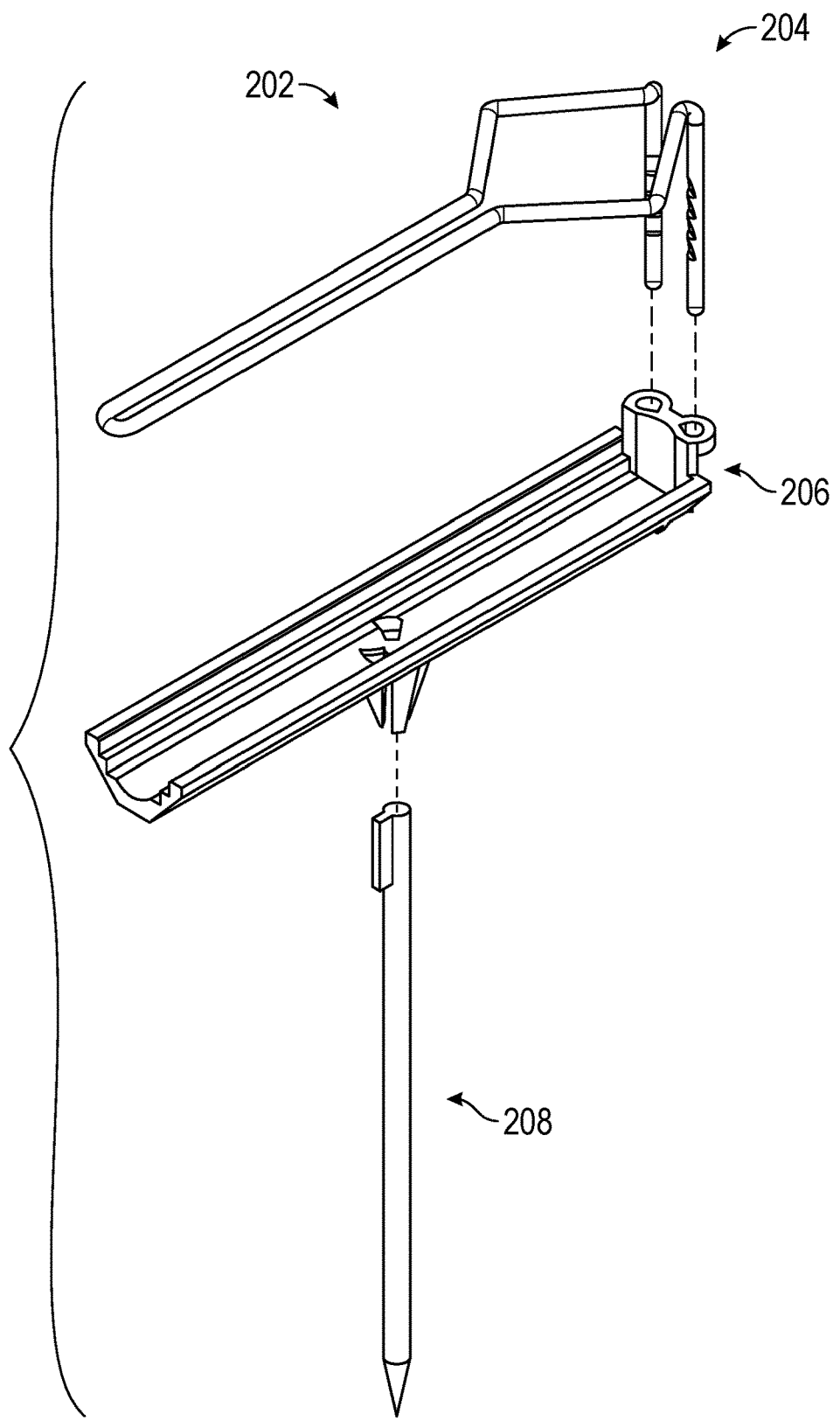
FIG. 2 depicts an exploded view of a keel adapter assembly, a keel trench, and a stake.

FIG. 2 shows an exploded view of an exemplary floating waterfowl decoy converter 202. In a non-limiting embodiment, the decoy converter 202 as shown in FIG. 2 may be assembled into an assembly of a keel adapter assembly 204, a keel trench 206, and a stake 208 to form the floating waterfowl decoy converter 202. Accordingly, as shown in FIGS. 6B-6F, a user may combine the components of the floating waterfowl decoy converter 202 to insert a floating decoy 102 into place within and between the keel adapter assembly 204 and the keel trench 206 and then couple those elements to a stake 208 in order to convert the floating decoy 102 into use as a field decoy. In this manner, the user does not have to purchase, store, and transport multiple types of floating decoys 102 and multiple types of field decoys. Rather, the user can convert and utilize the same floating decoy 102 as a field decoy by virtue of the system shown in FIG. 2 and by virtue of the floating waterfowl decoy converter 202. FIGS. 3-10 provide further details regarding exemplary elements, components, and method of using decoy converter 202 as shown in FIG. 2.

Figure 3:
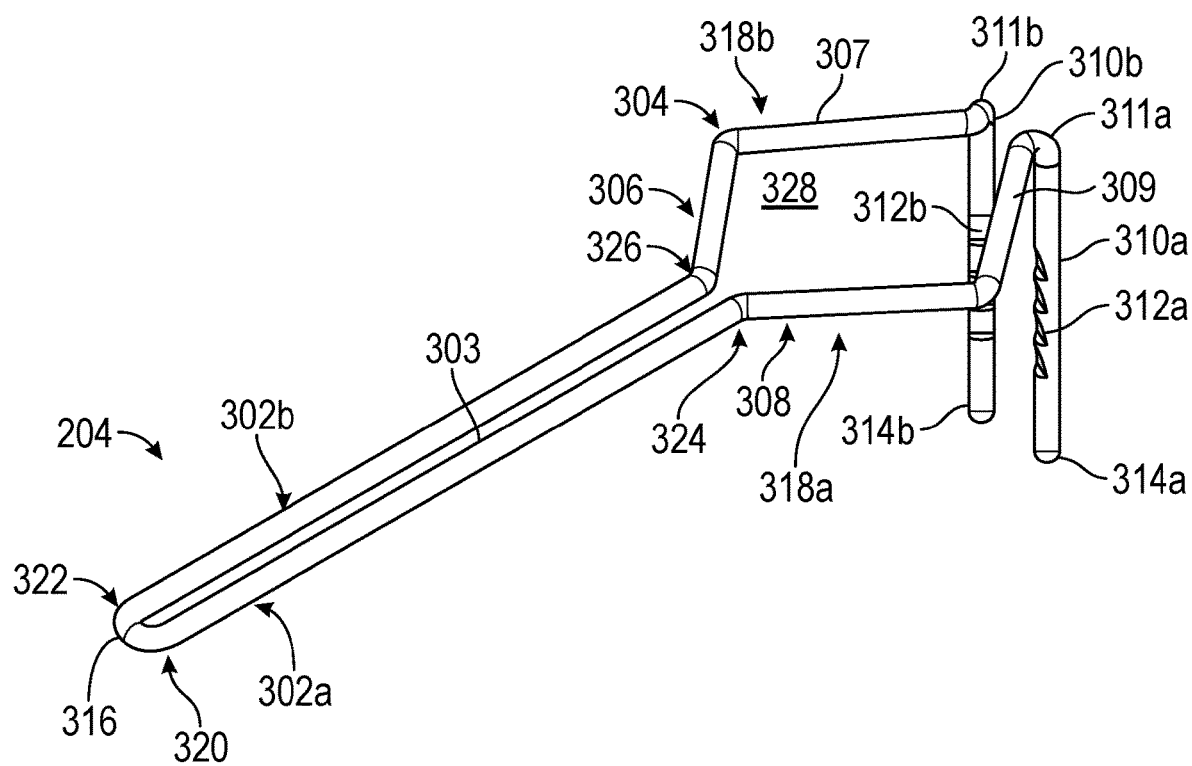
FIG. 3 depicts a pictorial illustration of a keel adapter assembly.

FIG. 3 depicts a pictorial illustration of the keel adapter assembly 204 shown in FIG. 2. The keel adapter assembly is intended to removably and detachably couple or connect to the keel trench 206, which is shown in FIG. 2 and further shown in more detail in FIGS. 4A-4C.

As shown in a non-limiting embodiment in FIG. 3, the keel adapter assembly 204 may include in a non-limiting embodiment a first bar 302a that is parallel to and joined at a common end 316 to a second bar 302b, which both connect respectively to a first backpiece 318a and a second backpiece 318b. As also shown in FIG. 3, a first vertical rod 310a may connect to the first backpiece 318a and a second vertical rod 310b may connect to the second backpiece 318b.

As shown in FIG. 3, the first bar 302a is parallel to the second bar 302b and defines a gap 303 in between the first bar 302a and the second bar 302b. A connecting piece 316 connects a first end 320 of the first bar 302a with a first end 322 of the second bar 302b. In a non-limiting embodiment, the connecting piece 316 of the keel adapter assembly 302 is curved as shown in FIG. 3. In other embodiments, the connecting piece 316 is not curved and can be straight and/or angled or encompass other shapes. The first bar 302a and the second bar 302b are oriented in a horizontal direction parallel to each other as shown in FIG. 3.

A second end 324 of the first bar 302a connects to a first end of the first backpiece 318a. Similarly, a second end 326 of the second bar 302b connects to a first end of the second backpiece 318b. The first backpiece 318a and the second backpiece 318b of the keel adapter assembly 204 are symmetrical in a non-limiting embodiment. As shown in FIG. 3, there is a somewhat wider gap 328 existing between the first backpiece 318a and the second backpiece 318b. Each backpiece 318a and 318b form a wide V-shape as shown in FIG. 3. In a non-limiting embodiment, the first backpiece 318a is formed from a first piece 308 that is angled in a first direction and joins with a second piece 309 that is angled in a second direction away from the angle of the first piece 308 to form that wide V-shape shown in FIG. 3. Similarly, the second backpiece 318b is formed from a first piece 306 that is angled in a first direction and joins with a second piece 307 that is angled in a second direction away from the angle of the first piece 306 to form that wide V-shape.

A first vertical rod 310a connects to a back end of the first backpiece 318a and a second vertical rod 310b connects to a back end of the second backpiece 318b. The first backpiece 318a connects to the top surface 311a of the first vertical rod 310a and the second backpiece 318b connects to the top surface 311b of the second vertical rod 310b. The first vertical rod 310a and the second vertical rod 310b are oriented in a vertical direction away from an underside of the first backpiece 318a and the second backpiece 318b.

Each vertical rod 310a, 310b may include a set of teeth 312a as shown in FIG. 3. The term "set" as used herein may refer to one or more of an item. As shown in FIG. 3, there may be at least four teeth 312 on each vertical rod 310a, 310b in a non-limiting embodiment, but there may be a greater or lesser number of teeth 312 in other embodiments. The set of teeth 312 are spaced apart from each other vertically on each vertical rod 310a, 310b of the keel adapter assembly 204. Notably, the set of teeth 312 allow the vertical rods 310a, 310b to respectively lock in place against a bottom raised ridge 402 of the keel trench 206, as shown in FIG. 4 and in FIGS. 6A-6F and further described below. Each vertical rod 310a, 310b has a terminal or bottom end 314a, 314b.

Figure 6B:
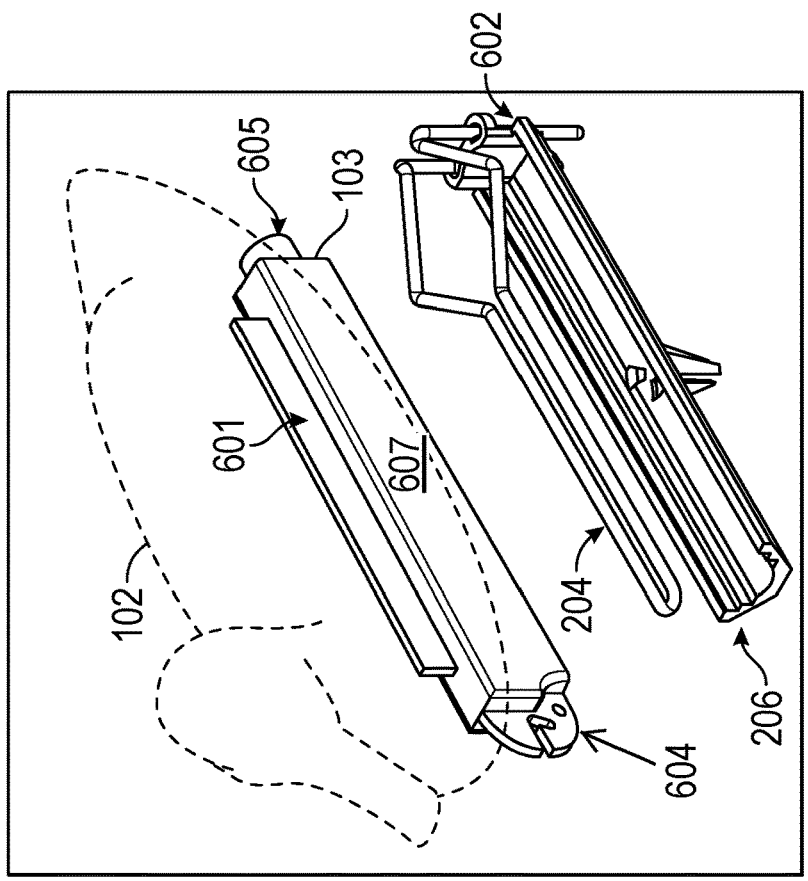
FIG. 6B depicts an exemplary floating waterfowl decoy positioned over the connected keel adapter assembly and the keel trench.

The keel adapter assembly 204 is an integral part of the decoy converter 202 and is intended to connect to the keel trench 206. When the decoy converter 202 is coupled to the keel trench 206, a user can position the keel 103 of a floating decoy 102 to fit into the keel adapter assembly 204 by positioning the keel 103 of the floating decoy 102 to fit into the gap 328 between the first backpiece 318a and the second backpiece 318b and into the gap 303 between the first bar 302a and the second bar 302b of the keel adapter assembly 204, which is shown in FIG. 6B-6D.

Figure 4A:
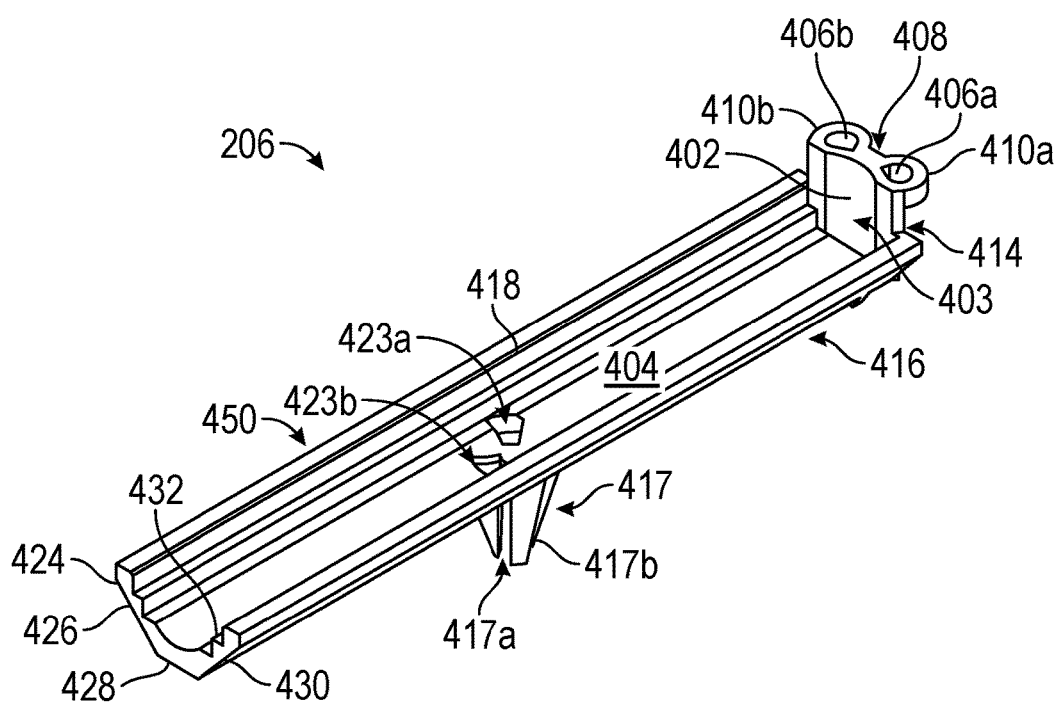
FIG. 4A depicts a pictorial illustration of a top perspective view of a keel trench.
Figure 4B:
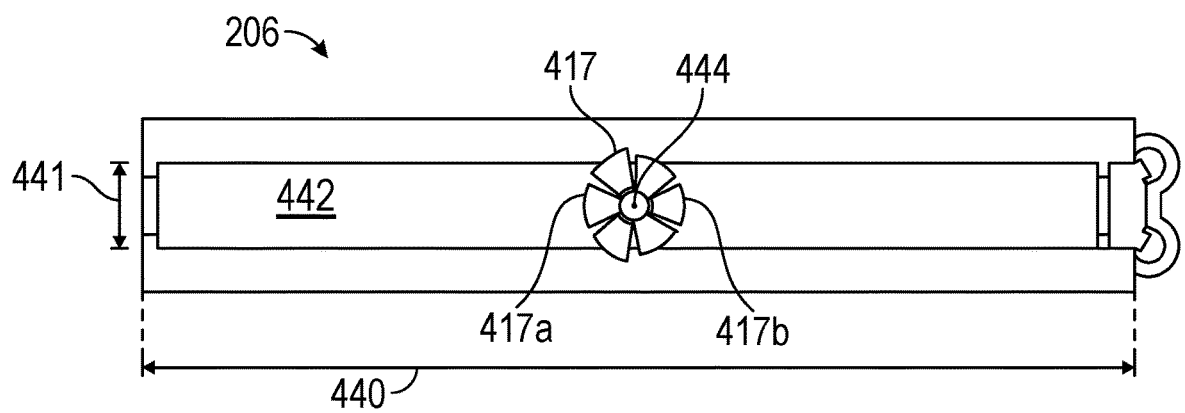
FIG. 4B depicts a pictorial illustration of a bottom view of the keel trench shown in FIG. 4A.
Figure 4C:
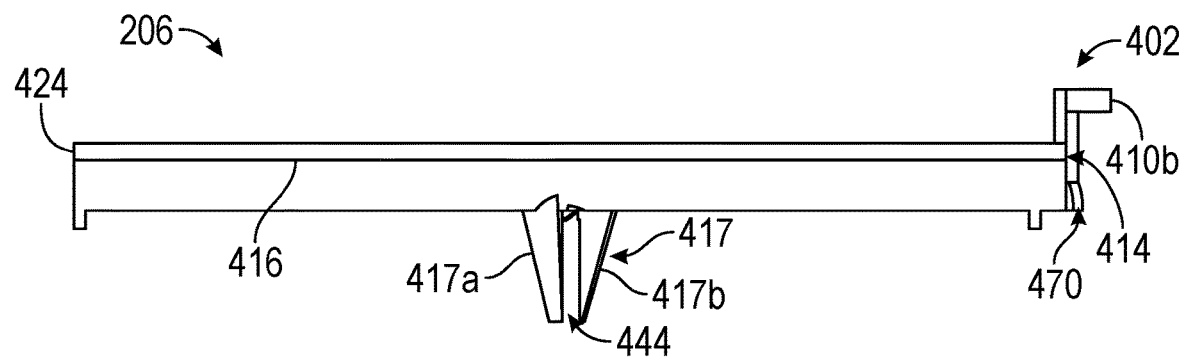
FIG. 4C depicts a pictorial illustration of a side view of the keel trench shown in FIG. 4A.

FIGS. 4A-4C depict pictorial illustrations of exemplary views of the keel trench 206 according to one or more non-limiting embodiments. FIG. 4A shows a top perspective view of a keel trench 206 according to a non-limiting embodiment, while FIG. 4B shows a bottom view, and FIG. 4C shows a side view of the keel trench 206.

As shown in FIGS. 4A-4C, the keel trench 206 may include a raised ridge 402 and a trench body 450. The raised ridge 402 is coupled to the trench body 450. The keel trench 206 serves to receive and hold the keel 103 of a floating decoy 102 in conjunction with the keel adapter assembly 204.

As shown in FIG. 4A, the raised ridge 402 of the keel trench 206 includes a first rod opening 406a and a second rod opening 406b. The first rod opening 406a on the raised ridge 402 is configured to receive the first vertical rod 310a of the keel adapter assembly 204. Similarly, the second rod opening 406b on the raised ridge 402 is configured to receive the second vertical rod 310b of the keel adapter assembly 204. As shown in FIG. 4A, the first rod opening 406a is an opening or hole generally centrally located on a first platform 410a, and the second rod opening 406b is an opening or hole generally centrally located on a second platform 410b of the raised ridge 402. The first platform 410a and the second platform 410b are oriented facing away from the trench body 450 and are spaced apart as shown at 408 in FIG. 4A. In other embodiments, the raised ridge 402 may comprise one single platform having one or more rod openings 406a, 406b or one elongated opening to hold both the first vertical rod 310a and the second vertical rod 310b.

As shown further in FIGS. 6A-6F, the first vertical rod 310a passes through the first rod opening 406a of the raised ridge 402 of the keel trench 204 such that the first vertical rod 310a passes through the rear portion 414 of the raised ridge 402. Similarly, the second vertical rod 310b passes through the second rod opening 406b of the raised ridge 402 of the keel trench 204 such that the second vertical rod 310b passes through the rear portion 414 of the raised ridge 402. FIGS. 8A-8D further depict pictorial illustrations of the first vertical rod 310a passing through the first rod opening 406a of the raised ridge 402 and the second vertical rod 310b passing through the second rod opening 406b of the raised ridge 402 on a rear part 414 of the raised ridge 402. As shown in FIGS. 4A-4C and also apparent from FIGS. 8A-8D, the first platform 410a and the second platform 410b project outwardly away from a rear surface of the raised ridge 402 and are in a raised position with relation to a bottom edge 470, as shown in FIG. 4C, of the raised ridge 402.

The trench body 450 of the keel trench 206 is formed with and/or otherwise joined to the raised ridge 402. The trench body 450 includes a first raised sidewall 416 and a second raised sidewall 418. In a non-limiting embodiment, the first raised sidewall 416 and the second raised sidewall 418 have a stepped design as shown at 432. The stepped design 432 means that the first raised sidewall 416 and the second raised sidewall 418 may have a series of steps 432 leading down to the trench 404 of the trench body 450 in a non-limiting embodiment. In another non-limiting embodiment, the steps 432 may be omitted and the first raised sidewall 416 and the second raised sidewall 418 may be curved or straight angled walls. In another embodiment, the first raised sidewall 416 and the second raised sidewall 418 may comprise straight, non-curved, non-stepped walls that are perpendicular with the trench 404.

The trench 404 is a lowermost interior surface defined by the first raised sidewall 416 and the second raised sidewall 418 that extend along a longitudinal direction of the trench body 450. The trench 404 acts as the valley of the keel trench 206 and is enabled to receive the elongated body 607, as shown for example in FIG. 6B, of the keel 103 of a floating decoy 102 and contain the keel 103 onto the trench 404 and in between the first raised sidewall 416 and the second raised sidewall 418.

In a non-limiting embodiment, the front end 424 of the trench body 450 is open ended as shown in FIG. 4A-4C. Further, as shown in FIG. 4A, the front end 424 may include a first angled edge 426 and a second angled edge 430 that is joined by a bottom piece 428.

Additionally, in a non-limiting embodiment, there may be one or more prongs 417 that protrude beneath an underside 442, as shown in FIG. 4B of the trench body 450. As shown in FIG. 4A-4C, there may be at least two prongs 417a, 417b, but there may be three, four, or more prongs 417 in other embodiments. As shown in FIGS. 4A-4C, the set of prongs 417 may generally be centrally positioned in the trench body 450. Further, there may be a prong opening or gap 444 between each prong 417a, 417b of the set of prongs 417. Further, the prongs 417a, 417b may angle towards each other so as to narrow the distance of the gap 444 between the bottom ends of each prong 417a, 417b. This may be so that the set of prongs 417 may best fit over a top end 506 of the stake 208, as shown in FIG. 5 and in FIG. 6F according to one or more non-limiting embodiments.

In a non-limiting embodiment, the length 440 of the keel trench 206 may be approximately 9.5 inches long, while the width 441 of the keel trench 206 may be approximately 0.7-1.5 inches wide. Further, it is noted that the length of the keel adapter assembly 204 may be a little longer than the keel trench 206 and may be about 9.68 inches long in a non-limiting exemplary embodiment. Further, the first vertical rod 310a and the second vertical rod 310b of the keel adapter assembly 204 may be approximately 2.8 or 3 inches long, according to one or more non-limiting embodiments. One of ordinary skill in the art is aware that other measurements and/or dimensions may alternatively be used.

Figure 10:
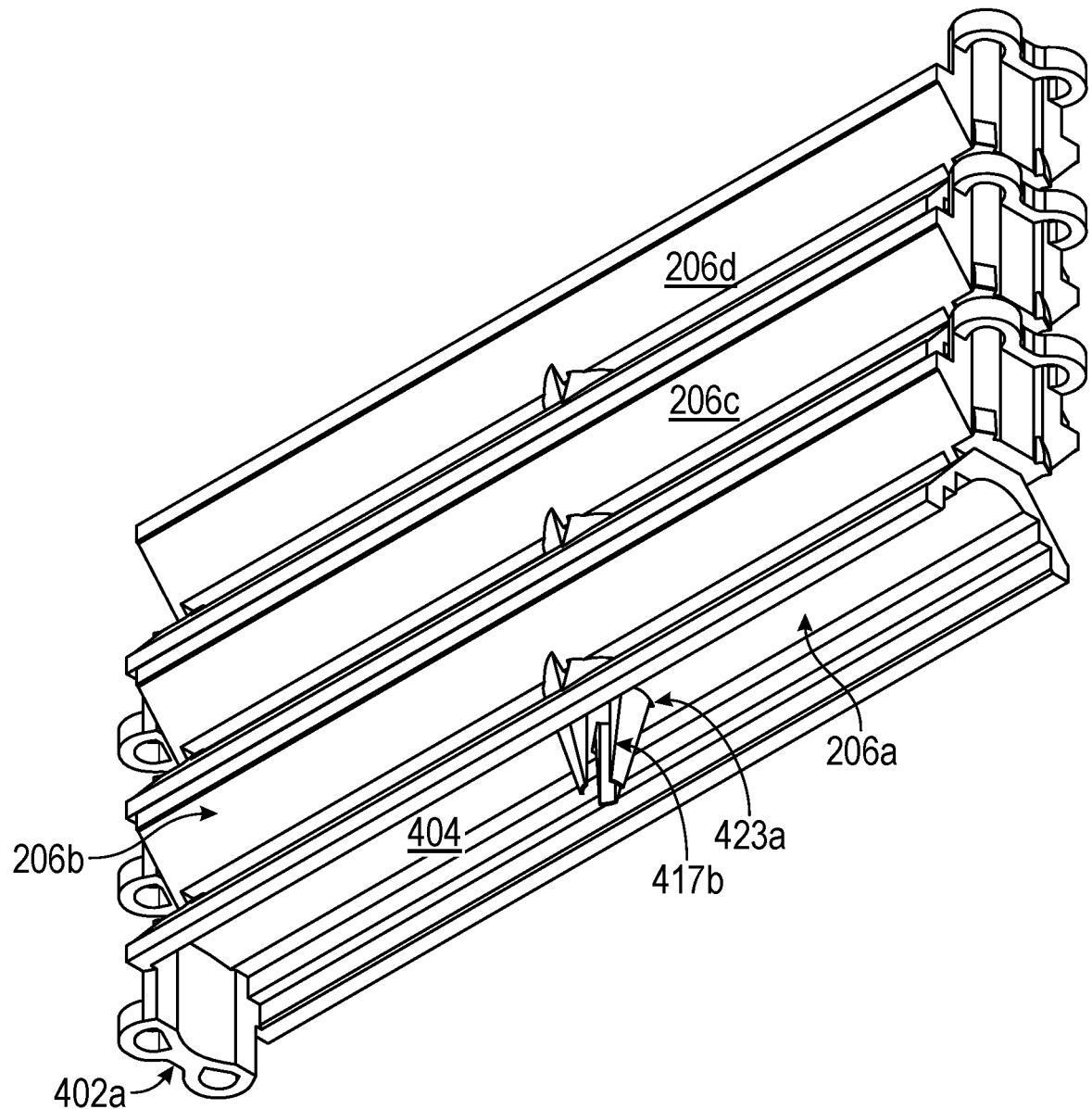
FIG. 10 is a pictorial illustration showing an example stacking of multiple keel trenches.

As shown in FIG. 4A, in a non-limiting embodiment, there may be cutouts 423 such as first cutout 423a and second cutout 423b formed on a top side of the trench 404 in alignment with each prong 417a, 417b of the set of prongs 417. The integration of the cutouts 423 in the keel trench 206 may be useful for purposes of storing a keel trench 206. In a non-limiting embodiment, multiple keel trenches 206 may be stacked one over another which is shown in FIG. 10. FIG. 10 shows approximately six keel trenches stacked onto each other in an inverse or flipped manner. Marked in FIG. 10 are at least four keel trenches 206 that are stacked together. As shown in FIG. 10, the set of prongs 417b for a second keel trench 206b stacked above a first keel trench 206a may be inserted through the cutouts 423a, 423b of the first keel trench 206b for easier storage purposes. As shown in FIG. 10, the multiple keel trenches 206 can be stacked in a flipped manner so that first keel trench 206a is facing downwards and flipped downwards while the second keel trench 206b stacked above the first keel trench 206a is flipped up, and then the next keel trench 206c above the second keel trench 206b is flipped down, and then the keel trench 206d above keel trench 206c is flipped up. Accordingly, the stacking of the keel trenches 206a-206d is in an inverse or flipped manner as shown in FIG. 10. The use of the cutouts 423 integrated within the design of the trench 404 of the keel trenches 206 may enable such stacking in one or more non-limiting embodiments, and this may be very useful for storing and transporting purposes and reducing the amount of space taken up by multiple keel trenches 206.

Figure 5:
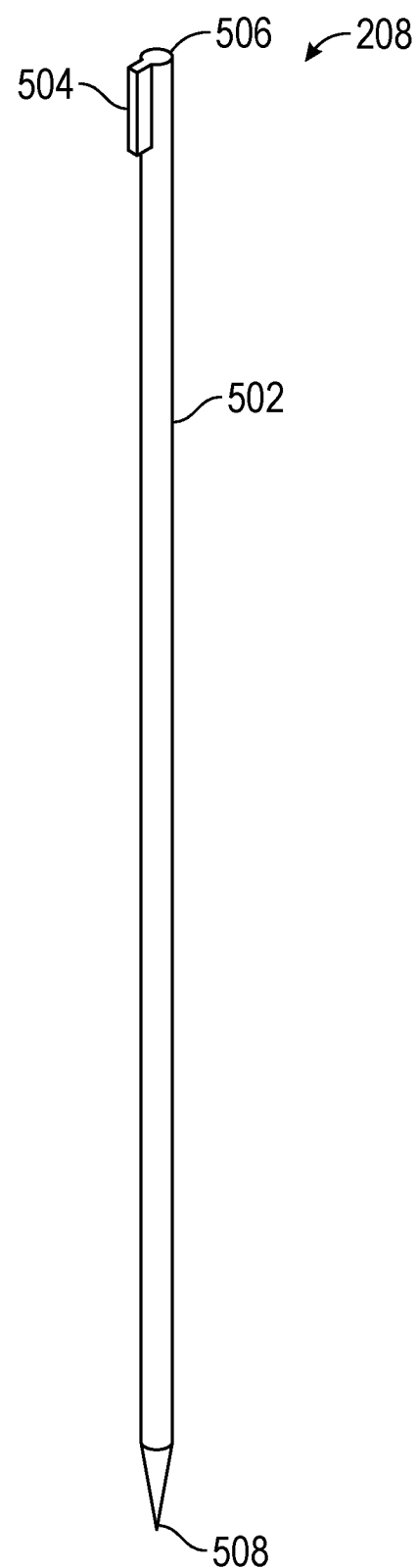
FIG. 5 depicts an exemplary stake.

Continuing with FIG. 5, FIG. 5 shows an exemplary stake 208 that makes up the system for the waterfowl decoy converter 202 in one or more non-limiting embodiments. As shown in FIG. 5, in a non-limiting embodiment, the stake 208 may include an elongated member 502 that extends in a vertical direction. The stake 208 may further comprise a top end 506 and a bottom pointed end 508, whereby the bottom pointed end 508 is configured to be inserted into a ground surface (whether underwater or not).

Further, as shown in FIG. 5, there may be a flange which may also be referred to as a projecting side piece 504 that projects from a side of the stake 208. In a non-limiting embodiment, the projecting side piece 504 may be generally a rectangular bar shape that adjoins the top surface 506 of the stake 208. In a non-limiting embodiment, the role of the flange or projecting piece 504 may be to limit rotational movement of the floating decoy 102 when positioned in both the keel adapter assembly 204 and the keel trench 206. The flange 504 makes contact with an underside 442 of the keel trench 206 and may limit the rotational movement of the keel trench 206, and by extension, the floating decoy 102 when contained in the keel trench 206. In a non-limiting embodiment, the floating decoy 102 when positioned in the decoy converter 202, and is mounted to the stake 208 of the decoy converter 102, may only rotate in a right or left direction up to about 15 degrees. This may be so that the floating decoy 102 appears more realistic and is not able to rotate to quickly and to far in any one direction in an unrealistic manner that may scare of waterfowl as well. Other variations of rotation are also envisioned in other non-limiting embodiments.

Notably, it is an intention to make the floating decoy 102 converted for field use to look as realistic as possible to other live waterfowl. A floating decoy 102 mounted to the top end 506 of the stake 208 is going to be able to rotate and have movement if there is any wind causing the floating decoy 102 to swivel and/or rotate. If a floating decoy 102 suddenly is able to rotate a full 360 degrees, this is an unnatural type of movement that will alarm any nearby waterfowl and scare them away, which is undesirable. Accordingly, in one or more non-limiting embodiments, it may be desirable that the decoy converter 202 enables a limited range of rotational movement when the floating decoy 102 is coupled or connected to the decoy converter 202. That limited range of rotational movement may range anywhere from 0-10 or 20 degrees in one or more non-limiting embodiments. In other embodiments, the rotational movement may be 0-30 or 40 degrees. In any instance, it is not desired that the floating decoy 102 when positioned within the decoy converter 202 (e.g., as shown in FIGS. 6A-6F) be able to rotate a full 180 degrees or a full 360 degrees as such extreme rotational movements will likely make the floating decoy 102 look like a fake waterfowl to other live waterfowl and also scare the live waterfowl that the user is hoping to attract. Accordingly, it may be desirable that the decoy converter 202 have a limited range of rotational movement if wind or another force were to cause the floating decoy 102 when in use to rotate at all. The projecting side piece 504 may be useful for having limited rotational movement, because the set of prongs 417, shown in FIGS. 4A-4C, when positioned over a top end 506 of the stake 208 and/or over the projecting side piece 504 are not able to rotate more than over a limited range of degrees.

It is noted that in a non-limiting embodiment, the set of prongs 417 of the keel trench 206 may fit over the top end 506 of the stake 208. In other embodiments, the set of prongs 417 of the keel trench 206 may fit within an interior top opening at a top end 506 of the stake 208.

FIGS. 6A-6F provide a storyboard of how the keel adapter assembly 204 may be removably and detachably coupled to a keel trench 206, how a floating decoy 102 may be positioned in place within the connected keel adapter assembly 204 and keel trench 206, and also how those components may be connected (removably) to a stake 208 that is inserted into a ground surface 606 to enable the use of the floating decoy 102 as a field decoy.

Figure 6A:
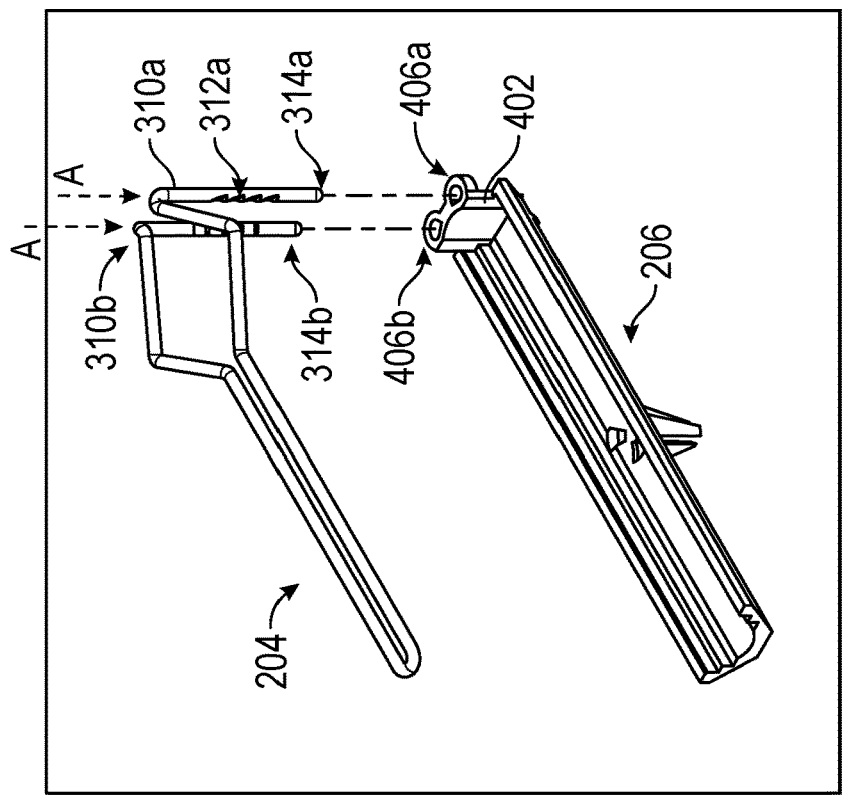
FIG. 6A depicts a pictorial illustration for coupling a keel adapter assembly to a keel trench.
Figure 6D:
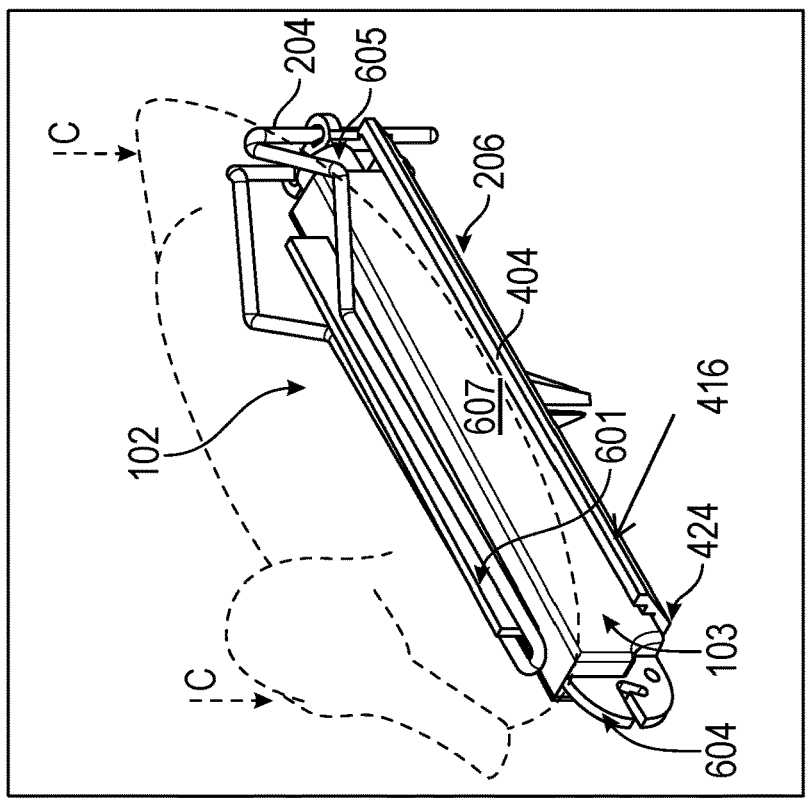
FIG. 6D depicts a pictorial illustration showing the floating waterfowl decoy being pushed down into the coupled keel adapter assembly and the keel trench.
Figure 6C:
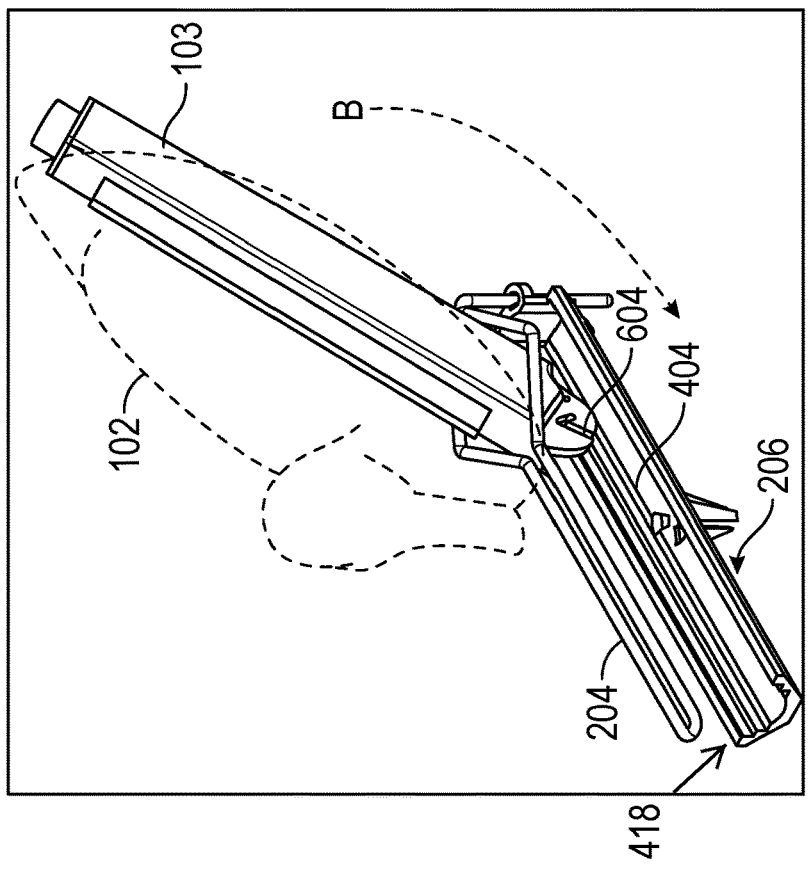
FIG. 6C depicts a pictorial illustration for inserting the floating waterfowl decoy into the coupled keel adapter assembly and the keel trench.

FIG. 6A shows that the first vertical rod 310a and the second vertical rod 310b of the keel adapter assembly 204 are configured to pass through the first rod opening 406a and the second rod opening 406b of the raised ridge 402 of the keel trench 206 in the downward direction as indicated by the arrows A as shown in FIG. 6A. The user may select which tooth 312a, 312b of the set of teeth 312 on each vertical rod 310a, 310b of the keel adapter assembly 204 the user would like to lock in place against a bottom edge 470 of the raised ridge 402 (as also shown for example in FIG. 8A) by estimating which teeth 312 provide the best height placement for the keel adapter assembly 204 above the keel trench 206.

Notably, the decoy converter 202 allows for the height of the keel trench 204 to be adjusted with respect to the keel trench 206 in order to best fit and suit the positioning of the floating decoy 102 within the keel adapter assembly 204 and the keel trench 206. Further, the adjustability of the height placement of the keel adapter assembly 204 with respect to the keel trench 206 of the decoy converter 202 further advantageously allows the decoy converter 202 to be used to convert multiple types of floating decoys 102 that have multiple sizes and shapes of keels 103, as shown in FIGS. 9A-9D, to fit within the coupled keel adapter assembly 204 and the keel trench 206.

Accordingly, the selection of each tooth 312a, 312b of the set of teeth 312 on the first vertical rod 310a and the second vertical rod 310b determines how tall or short or the height of the keel adapter assembly 204 is positioned with respect to the keel trench 206.

Accordingly, the integration of the vertical rods 310a, 310b of the keel adapter assembly 204 into the raised ridge 402 of the keel trench 206 enable some adjustability to the height and accommodation of varying sizes and types of keels 103 for varying types of floating waterfowl decoys 102.

Notably, the keel adapter assembly 204 is removably and detachably attached to the keel trench 206 by virtue of the vertical rods 310a, 310b of the keel adapter assembly 204 passing through the rod openings 406a, 406b of the raised ridge 402 on the keel trench 206, whereby a user can detach the keel adapter assembly 204 anytime from the keel trench 206 by unlocking the selected locking tooth 312a,312b on each vertical rod 310a, 310b and pulling the keel adapter assembly 204 up and away from the keel trench 206 so that the vertical rods 310a, 310b pass upward through the rod openings 406a, 406b. FIGS. 8A-8D provide further pictorial illustrations about such a process to unlock the teeth 312a, 312b and remove the connection between the keel adapter assembly 204 from the keel trench 206 and/or to adjust the height placement of the keel adapter assembly 204 with respect to the keel trench 206. Notably, as shown in FIGS. 2-10, in a non-limiting embodiment, the keel adapter assembly 204 is not attached with fasteners or ties to the keel trench 206.

FIG. 6B shows that the user may position the floating decoy 102 over or near the connected keel adapter assembly 204 and keel trench 206 to prepare for insertion of the keel 103 of the floating decoy 102 into the keel adapter assembly 204 as coupled to the keel trench 206. Reference number 602 as shown in FIG. 6B generally points to the general location where the vertical rods 310a, 310b of the keel adapter assembly 204 are inserted into the respective rod openings 406a, 406b of the raised ridge 402 of the keel trench. The floating decoy 102, as noted above and shown in FIGS. 1A-1B, include a body 106, head 108, and tail 110 made to appear similar to any desired type of waterfowl, such as, but not limited to ducks and geese.

As shown in FIG. 6B, the keel 103 of the floating decoy 102 may include a top protruding surface 601, a keel front surface 604, a keel body 607, and a keel rear surface 605. As further clarified and shown in FIGS. 9A-9D, there is not just one type of keel 103 for every floating decoy 102. Some keels 103 have higher top surfaces 601 than others, while some keels 103 have front surfaces 604 that extend up to and beyond a front end 424 of the keel trench 206 (e.g., as shown in FIG. 9B), and many keels 103 have a varying overall height from each other. Further discussion of differences between keels 103 is provided below with respect to FIGS. 9A-9D.

FIG. 6C is a pictorial illustration illustrating how the user may begin to insert the keel 103 of the floating decoy 102 into the connected keel adapter assembly 204 and keel trench 206. To do so, the user may angle the front surface 604 of the keel 103 and the floating decoy 102 itself in a downward direction as shown in FIG. 6C, and begin to orient the front surface 604 of the keel 103 through the gap 328, as shown in FIG. 3, of the keel adapter assembly 204, whereby the gap 328 is between the first backpiece 318a and the second backpiece 318b of the keel adapter assembly. Further, the user may push or otherwise manipulate the keel 103 of the floating decoy 102 through the first gap 328 and into the next gap 303 between the first bar 302a and the second parallel bar 302b of the keel adapter assembly 204 in the direction of the arrow B as shown in FIG. 6C. As shown in FIG. 6D, when the keel 103 is situated in place, the body 607 of the keel 103 is contained by the keel adapter assembly 204 and the keel trench 206. In other words, the keel 103 and its body 607 are between the first raised sidewall 416 and the second raised sidewall 418 of the keel trench 206. Further, a bottom surface of the keel 103 is contacting or resting on the trench surface 404. Further, the keel front side 604 is able to rest before, at, or past the open front side 424 of the keel trench 206, as shown in FIG. 6C. Further, the keel rear surface 605 is able to contact or rest proximate to the interior surface 403 of the raised ridge 402 of the keel trench 206, as also shown illustratively in FIG. 6C. To further position the floating decoy 102 in place within the coupled keel adapter assembly 204 and the keel trench 206, the user may want to push the floating decoy 102 generally downward in the direction of arrow C as shown in FIG. 6D to properly situate and position the floating decoy 102.

Advantageously, as shown in FIG. 6D, the keel 103 of the floating decoy 102 is properly supported so that the keel 103 is fully contained and defined by the raised sidewalls 416, 418 of the keel trench 206 and supported at the rear 605 of the keel 103 by the raised ridge 402 which prevents the floating decoy 102 from falling backwards out through any gaps. Further, the front surface 424 of the keel trench 204 is open ended in a non-limiting embodiment because there may be more variations and differences in lengths, shapes, and overall size design of a front end 604 of a keel 103. The curved connecting piece 316 of the keel adapter assembly 204 may be useful to still hold the front end of the top piece 601 of the keel 103, as shown in FIG. 6D, and prevent the keel 103 from falling forward.

Advantageously, the user can change and reposition the height of the keel adapter assembly 204 with respect to the keel trench 206 to best suit the height of the keel 103 and/or the height of the floating decoy 102 when positioned within the keel adapter assembly 204 as coupled to the keel trench 206.

Figure 6F:
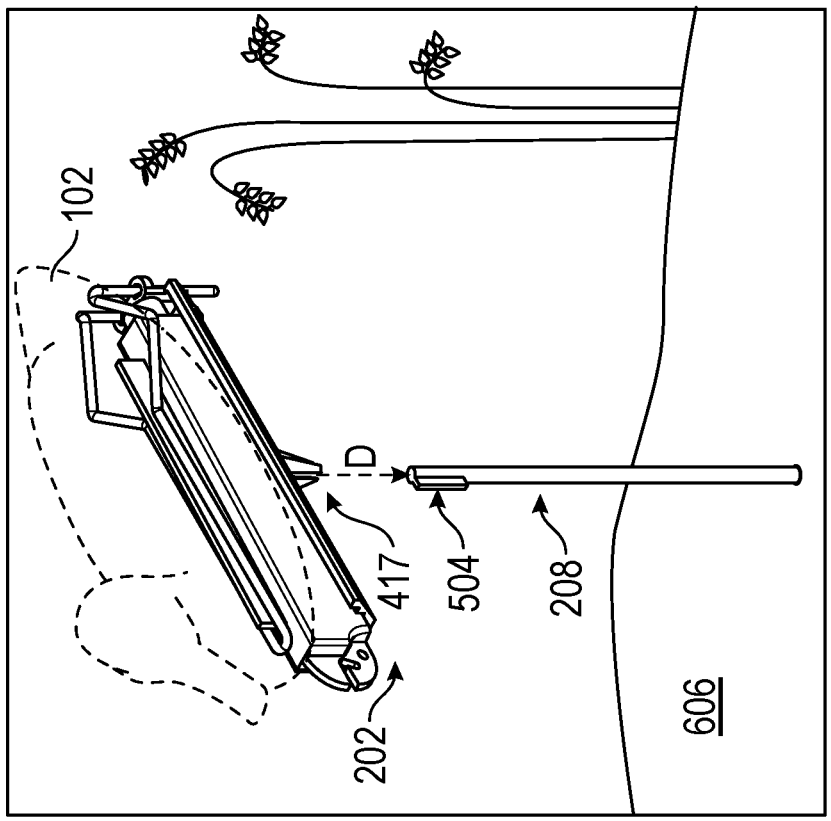
FIG. 6F depicts a pictorial illustration showing the floating waterfowl decoy inserted within the connected keel adapter assembly and the keel trench being coupled to a top end of the stake shown in FIG. 6E.
Figure 6E:
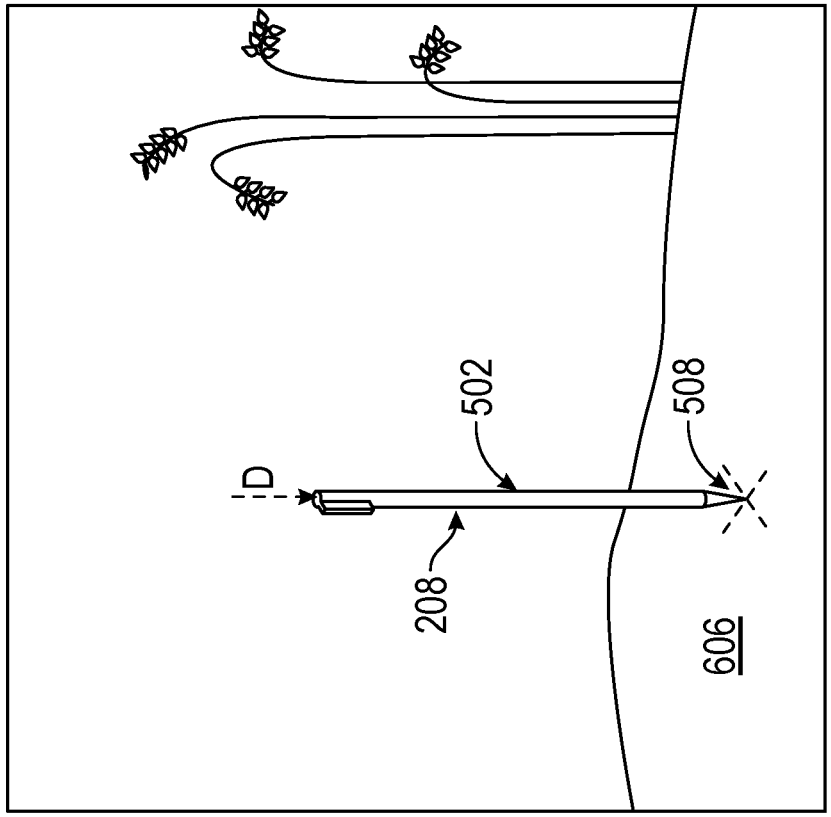
FIG. 6E depicts a pictorial illustration showing a stake being inserted into an exemplary ground surface.

FIG. 6E shows the user has hammered or otherwise placed the pointed end 408 of the stake 502 of the decoy converter 202 into a ground surface 606 at a desired spot or location in the direction of the arrow D. FIG. 6F shows that the keel adapter assembly 204 as connected to the keel trench 206 with the floating decoy 102 positioned within the keel adapter assembly 204 and the keel trench 206 may be attached to the top end 506 of the stake 208. Notably, the floating decoy 102 is not attached with fasteners or adhesives or ties to position the floating decoy 102, but rather is held in place by the components of the decoy converter 202, including the components of the keel adapter assembly 204 and the keel trench 206 as attached or mounted onto the stake 208.

In a non-limiting embodiment, in order to attach the keel adapter assembly 204 with the keel trench 206 and the inserted floating decoy 102 onto the stake 208, the user may lower the keel adapter assembly 204 with the keel trench 206 and the inserted floating decoy 102 onto the stake 208 in the direction of the arrow D so that the set of prongs 417 either fits over a top end 506 of the stake 208 or into an opening of the stake 208. The user can gently push down further so that the coupled keel adapter assembly 204 and keel trench 206 are securely (yet removably) attached to a top end 506 of the stake 208. Once the user does so, the floating decoy 102 is converted into a field decoy and may be left in place as staked into the ground 606 to attract any live waterfowl. As noted above, the floating decoy 102 is enabled when removably inserted into the keel adapter assembly 204 and the keel trench 206 to rotate over a limited range of degrees and have a limited range of motion if the wind causes the floating decoy 102 to rotate or swivel. In a non-limiting embodiment, the projecting side piece 504 of the stake 208, as shown in FIG. 6F may further function to limit the rotational movement.

Figure 7:
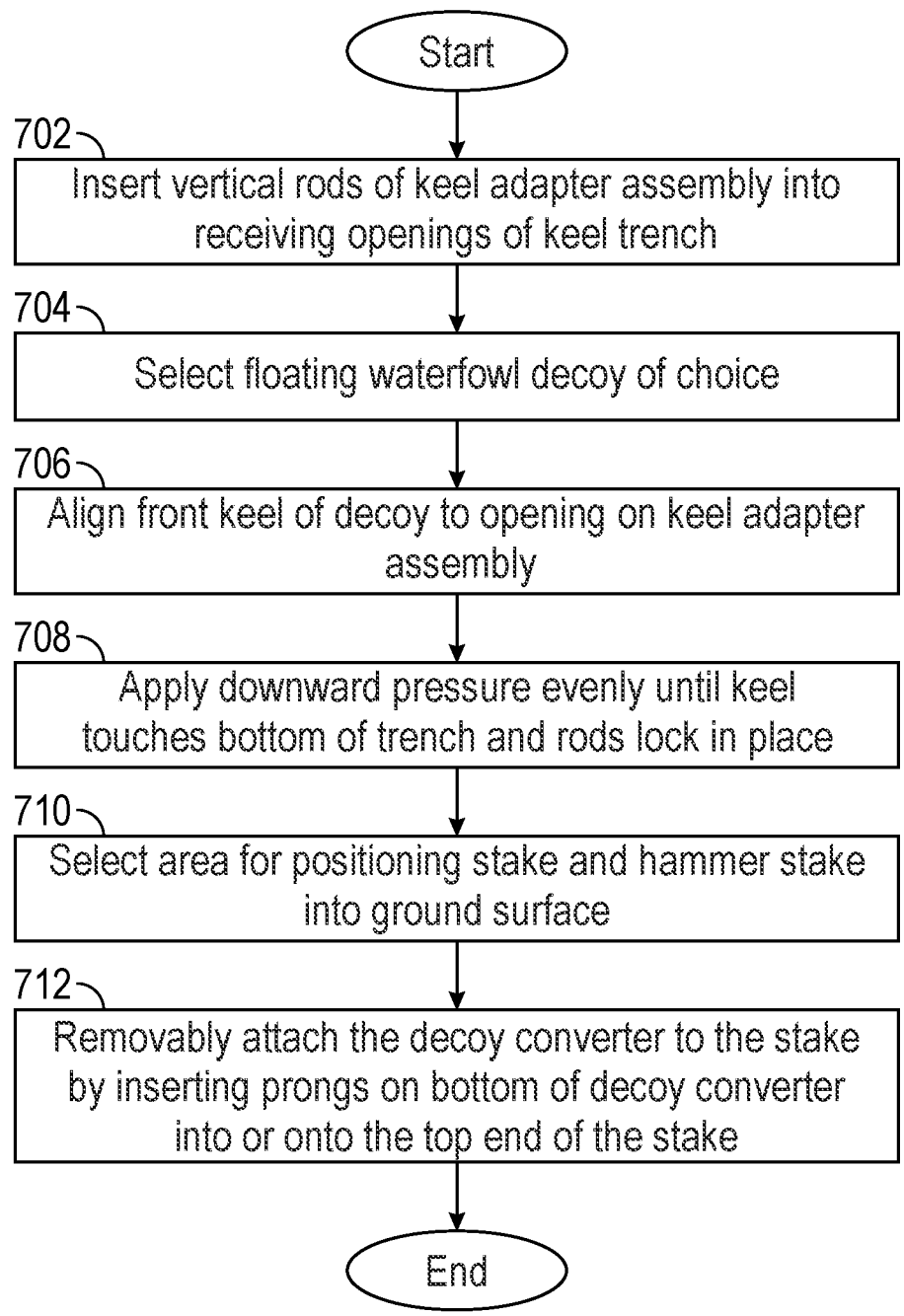
FIG. 7 is an exemplary flowchart for a method of using a floating waterfowl decoy converter system.

FIG. 7 is a flowchart with an exemplary method of using a floating decoy converter 202 as shown and described herein. At step 702, the method may include inserting the vertical rods 310a, 310b of the keel adapter assembly 204 into the receiving rod openings 406a, 406b of the raised ridge 402 of the keel trench 206. At step 704, the method may further include a user selecting a floating waterfowl decoy 102 of choice. At step 706, the method may include aligning the front surface 604 of the keel 103 of the floating decoy 102 into the openings 328, 303 of the keel adapter assembly 204. At step 708, the user may further apply downward pressure in an even manner until the keel 103 of the floating decoy 102 touches the trench 404 and the rods 310a, 310b temporarily lock on place against a bottom edge 470 of the raised ridge 402 of the keel trench 206. At step 710, the user may select the area for positioning the stake 208 and/or hammering the stake 208 into the ground surface 606. At step 712, the user can position the set of prongs 417 on the underside 442 of the keel trench 206 to fit onto the stake 208 or into an opening at a top end 506 of the stake 208. Further, when the user no longer needs the floating decoy 102 to be staked into the ground surface 606 to be used as a field decoy, the user can removably attach the decoy converter 202 and all of its components (e.g., keel adapter assembly 204, keel trench 206, and stake 208) and easily store them for future use.

Figure 8A:
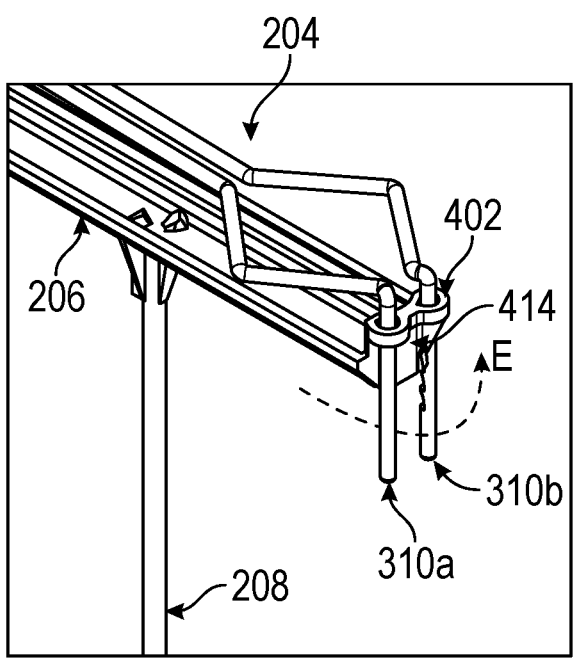
FIG. 8A is a pictorial illustration showing a first step for unlocking a first vertical rod and a second vertical rod of a keel adapter assembly from a connected keel trench in order to remove the keel adapter assembly and/or to adjust the height of the keel adapter assembly.
Figure 8B:
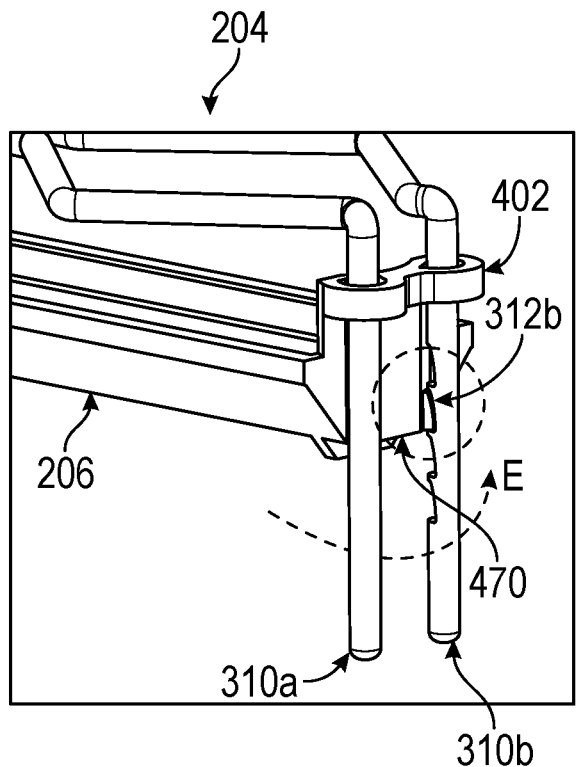
FIG. 8B is a pictorial illustration showing a second step for unlocking a first vertical rod and a second vertical rod of a keel adapter assembly from a connected keel trench.
Figure 8C:
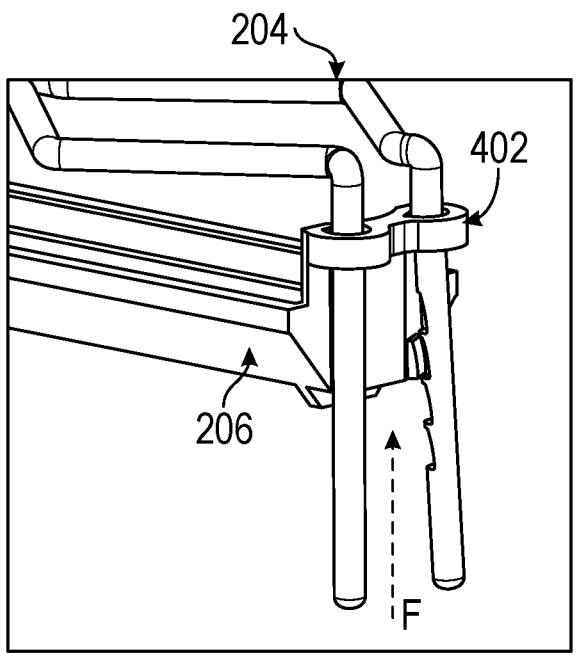
FIG. 8C is a pictorial illustration showing a third step for unlocking a first vertical rod and a second vertical rod of a keel adapter assembly from a connected keel trench.
Figure 8D:
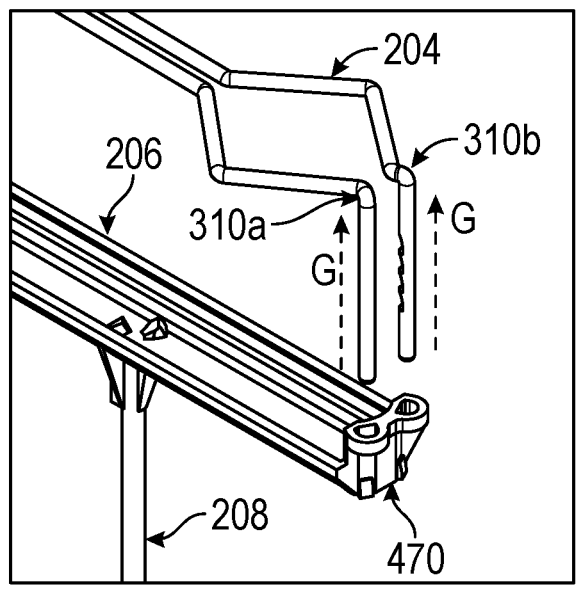
FIG. 8D is a pictorial illustration showing a fourth step for unlocking a first vertical rod and a second vertical rod of a keel adapter assembly from a connected keel trench.

FIGS. 8A-8D show how the teeth 312 of the vertical rods 310a, 310b of the keel adapter assembly 204 may be unlocked from a bottom edge 470 of the raised ridge 402 of the keel trench 206. As shown in FIG. 8A, the user may apply a force in the direction of arrow E up and away from the bottom edge 470 in order to cause the teeth 312 of each vertical rod 310a, 310b to move away and clear the bottom edge 470 of the raised ridge 402, as also shown in FIG. 8B. As shown in FIG. 8C, the user can apply an upward force in the direction of arrow F to cause the vertical rods 310a, 310b begin to move up and away from the edge 470 in order for the vertical rods 310a, 310b to fully pass upwardly through and clear the rod openings 406a, 406b of the raised ridge 402 of the keel trench 206 in the direction of the arrows G as shown in FIG. 8D.

FIGS. 8A-8D further highlight the unique design of the raised ridge 402 of the keel trench 206 whereby the vertical rods 310a, 310b of the keel adapter assembly 204 may pass through the rod openings 406a, 406b on their respective platforms 410a, 410b and be contained by the platforms 410a, 410b, and further whereby the remainder of the body of the vertical rods 310a, 310b can hang below the rod openings 406a, 406b proximate to the rear surface 414 of the raised ridge 402 of the keel trench 206.

FIGS. 9A-9D highlight some examples of varying keels 103 that are currently existent and used with various floating decoys 102. While not shown in FIGS. 9A-9D, normally, there would be a body 106 of a waterfowl with a head 108 and tail 110 coupled to the top surface 601 of the keels 103 shown in FIGS. 9A-9D.

FIG. 9A shows a first example 902 of a keel 103. FIG. 9B shows a second example 904 of another type of keel 103. FIG. 9C shows a third example 906 of another type of keel 103. FIG. 9D shows a fourth example 908 of another type of keel 103. As shown in FIGS. 9A-9D, the bodies 607 of the keels 103 vary in terms of size and shape and form. Further, some keels 103 have front surfaces 604 that are far from the front end 424 of the keel trench 206, which is shown for example in FIG. 9A. Other keels 103 have front surfaces 604 that are past the front end 424 of the keel trench 206 as shown in FIG. 9B and FIG. 9C. While other keels 103 may have front surfaces 604 that are in line or at the front end 424 of the keel trench 206 as shown in FIG. 9D.

Further, the height, shape, and form of the top protruding piece 601 of the keels 103 shown in FIGS. 9A-9D vary greatly such that some top protruding pieces 601 may extend upwardly much higher than others. Advantageously, the components of the keel adapter assembly 204, including the first bar 302a adjoined to the second bar 302b with the gap 303 in between, as shown in FIG. 3, can encompass the projecting top pieces 601 of the various types of keels 103. Further, the components of the exemplary keel trench 206 including its raised ridge 402, which acts as an enclosure for the rear surface 605 of a keel 103, and the open front end 424 of the keel trench 206 which allows the front surfaces 604 of the keels 103 to project past the front end 424 of the keel trench 206 work well with the raised sidewalls 416 and 418 of the keel trench 206 which still are able to fully contain the body 607 of the keels 103. Accordingly, the floating decoy converter 202 can accommodate a multitude of keels 103 and floating decoys 102 (including those shown in FIGS. 9A-9D and others not shown herein) having a variety of sizes, shapes, and overall designs.

As noted above, the decoy converter 104 as shown in FIGS. 1A-1B and the decoy converter as shown in FIGS. 2-10 as described herein helps hunters, scientists, waterfowl observers, and other users engage with live waterfowl for hunting or various other purposes. Advantageously, the decoy converters 104 and 202 further allow a user to save money and space in purchasing and storing many different types of decoys. Rather, the user can purchase one or more floating decoys 102 and by coupling the floating decoys 102 to the decoy converters 104 and/or 202, the user can use the floating decoy 102 in a field application with or without a body of water by inserting the decoy converters 104, 202 using the stake 208 into a ground surface. Many other advantages and benefits may be provided by the decoy converters 104, 202 as described herein.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" as used herein may refer to one or more of any items.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for a floating waterfowl decoy converter, comprising:
    a keel adapter assembly for holding a keel of a floating waterfowl decoy in a keel trench, comprising:
        a first bar that is parallel to a second bar,
            wherein a first end of the first bar is joined with a connecting piece to a first end of the second bar,
            wherein a first gap exists between the first bar and the second bar;
        a first back piece, wherein a first end of the first back piece is joined with a second end of the first bar;
        a second back piece, wherein a first end of the second back piece is joined with a second end of the second bar,
            wherein a second gap exists between the first back piece and the second back piece;
        a first vertical rod coupled to a second end of the first back piece;
        a second vertical rod coupled to a second end of the second back piece,
            wherein the first vertical rod is parallel to the second vertical rod,
            wherein the first vertical rod and the second vertical rod each comprise a set of teeth spaced apart in a vertical direction on the first vertical rod and the second vertical rod;
    the keel trench, wherein the keel adapter assembly is configured to be removably coupled to the keel trench, the keel trench comprising:
        a raised ridge comprising a first opening and a second opening,
            wherein the first opening is configured to receive the first vertical rod of the keel adapter assembly, and wherein the second opening is configured to receive the second vertical rod of the keel adapter assembly,
            wherein a height of the keel adapter assembly is adjustable by adjusting how far down the first vertical rod and the second vertical rod of the keel adapter assembly are pushed down into the first opening and the second opening, respectively, of the raised ridge of the keel trench,
            wherein the set of teeth on each of the first vertical rod and of the second vertical rod of the keel adapter assembly are configured to temporarily lock a position of the first vertical rod and the second vertical rod of the keel adapter assembly to set the keel adapter assembly at a desired height above the keel trench;
        a trench body, wherein the trench body is coupled to the raised ridge,
            wherein the trench body comprises a first raised sidewall and a second raised sidewall,
                wherein the first raised sidewall and the second raised sidewall encompass a lower trench surface defined by the first raised sidewall and the second raised sidewall,
            and wherein the trench body of the keel trench further comprises a set of prongs that protrude from an underside of the trench body of the keel trench.

2. The system of claim 1, further comprising:
    a stake, wherein the stake comprises an elongated upright pole having a top end and a pointed end at a terminal end of the elongated upright pole.

3. The system of claim 2, wherein the set of prongs of the keel trench are configured to grip onto and over the top end of the stake.

4. The system of claim 2, wherein the stake further comprises a protruding piece that is joined to a side of the top end of the stake, wherein the set of prongs of the trench body of the keel trench fit over the top end and also over the protruding piece of the stake.

5. The system of claim 4, wherein the protruding piece limits a degree of rotational movement of the keel trench when the keel trench is coupled to the top end of the stake.

6. The system of claim 2, wherein instead of the set of prongs being configured to grip onto the top end of the stake, the set of prongs are insertable into an opening on the top end of the stake.

7. The system of claim 1, wherein the first back piece and the second back piece each comprise a first backpiece bar that is angled in a first direction and a second backpiece bar that is angled in a second direction away from the first backpiece bar wherein together the first backpiece bar and the second backpiece bar form a general V-shape.

8. The system of claim 1, wherein the first back piece and the second back piece are symmetrical and face towards each other with the second gap spanning between the first back piece and the second back piece.

9. The system of claim 1, wherein the connecting piece is a curved connecting piece that joins the first end of the first bar to the first end of the second bar of the keel adapter assembly.

10. The system of claim 1, wherein the first raised sidewall and the second raised sidewall of the trench body of the keel trench have a stepped design leading down to the lower trench surface between the first raised sidewall and the second raised sidewall.

11. The system of claim 1, wherein a front end of the keel trench is open ended, wherein the front end of the keel trench is on a opposite side from the raised ridge of the keel trench.

12. The system of claim 1, wherein the set of teeth on each of the first vertical rod and the second vertical rod of the keel adapter assembly face inward towards a back side of the raised ridge of the keel trench in order for a tooth of the set of teeth on each of the first vertical rod and the second vertical rod to grip a bottom edge of the raised ridge to temporarily lock the keel adapter assembly in place.

13. The system of claim 1, wherein when the keel adapter assembly is removably coupled to the keel trench, a floating waterfowl decoy is insertable into the keel trench,
wherein a top piece of the keel of the floating waterfowl decoy fits between the first bar and the second bar of the keel adapter assembly,
wherein a body of the keel of the floating waterfowl decoy fits between the first raised sidewall and the second raised sidewall of the keel trench,
and wherein a back side of the keel of the floating waterfowl decoy contacts or stops before an interior facing surface of the raised ridge of the keel trench.

14. A method of using a floating waterfowl decoy converter to convert a floating waterfowl decoy for use as a field waterfowl decoy, the method comprising:
providing the floating waterfowl decoy converter, the floating waterfowl decoy converter comprising:
a keel adapter assembly, the keel adapter assembly comprising:
a first bar that is parallel to a second bar, wherein a first end of the first bar is joined with a connecting piece to a first end of the second bar, wherein a first gap exists between the first bar and the second bar;
a first back piece, wherein a first end of the first back piece is joined with a second end of the first bar;
a second back piece, wherein a first end of the second back piece is joined with a second end of the second bar,
wherein a second gap exists between the first back piece and the second back piece;
a first vertical rod coupled to a second end of the first back piece;
a second vertical rod coupled to a second end of the second back piece,
wherein the first vertical rod is parallel to the second vertical rod,
wherein the first vertical rod and the second vertical rod each comprise a set of teeth spaced apart in a vertical direction on the first vertical rod and the second vertical rod;
a keel trench, wherein the keel adapter assembly is configured to be removably coupled to the keel trench, the keel trench comprising:
a raised ridge comprising a opening and a second opening,
wherein the first opening is configured to receive the first vertical rod of the keel adapter assembly, and wherein the second opening is configured to receive the second vertical rod of the keel adapter assembly,
wherein a height of the keel adapter assembly is adjustable by adjusting how far down the first vertical rod and the second vertical rod of the keel adapter assembly are pushed down into the first opening and the second opening, respectively, of the raised ridge of the keel trench,
wherein the set of teeth on each of the first vertical rod and of the second vertical rod of the keel adapter assembly are configured to temporarily lock a position of the first vertical rod and the second vertical rod of the keel adapter assembly to set the keel adapter assembly at a desired height above the keel trench; and
a trench body, wherein the trench body is coupled to the raised ridge, wherein the trench body comprises a first raised sidewall and a second raised sidewall, wherein the trench body comprises a lower trench surface in between the first raised sidewall and the second raised sidewall, and wherein the trench body comprises a set of prongs that protrude from an underside of the trench body of the keel trench; and
a stake, wherein the stake comprises an elongated upright pole having a top end and a pointed end at a terminal end of the elongated upright pole;
coupling the keel adapter assembly to the keel trench further comprising:
inserting the first vertical rod of the keel adapter assembly into the first opening of the raised ridge of the keel trench;
inserting the second vertical rod of the keel adapter assembly into the second opening of the raised ridge of the keel trench;
temporarily locking the first vertical rod of the keel adapter assembly in place within the first opening of the raised ridge of the keel trench by pushing a first tooth of the set of teeth on the first vertical rod against a bottom edge of the raised ridge of the keel trench;
temporarily locking the second vertical rod of the keel adapter assembly in place within the second opening of the raised ridge of the keel trench by pushing a first tooth of the set of teeth on the second vertical rod against the bottom edge of the raised ridge of the keel trench;
selecting the floating waterfowl decoy, the floating waterfowl decoy comprising a keel attached to an underside of a body of the floating waterfowl decoy, the keel comprising a keel front side, a keel body, and a keel back side;
holding the floating waterfowl decoy over the keel adapter assembly coupled to the keel trench;
angling the keel front side of the floating waterfowl decoy in a downward direction and inserting the keel front side of the floating waterfowl decoy into the second gap between the first backpiece and the second backpiece of the keel adapter assembly;
pushing the keel body of the floating waterfowl decoy into the trench body of the keel trench, wherein the keel body of the floating waterfowl decoy is contained between the first raised sidewall and the second raised sidewall of the keel trench;
selectively adjusting a height of the keel adapter assembly coupled to the keel trench;
securing the stake into a desired spot on a ground surface or into an underwater ground surface of a body of water, further comprising inserting the pointed end of the stake into the ground surface or the underwater ground surface; and
pushing the set of prongs of the keel adapter assembly onto the top end of the stake while the keel adapter assembly is coupled to the keel trench and while the floating waterfowl decoy is contained within the keel adapter assembly and the keel trench, wherein the floating waterfowl decoy is converted for use as the field waterfowl decoy upon connecting the set of prongs to the stake.

15. The method of claim 14, wherein selectively adjusting a height of the keel adapter assembly coupled to the keel trench further comprises:

applying a first upward force on the first vertical rod to dislodge the first tooth of the first vertical rod from the bottom edge of the raised ridge;

applying the first upward force on the second vertical rod to dislodge the first tooth of the second vertical rod from the bottom edge of the raised ridge;

ensuring that the first tooth of the first vertical rod and the first tooth of the second vertical rod clear the bottom edge of the raised ridge;

continuing to pull upward on the keel adapter assembly until the first vertical rod and the second vertical rod pass upwardly through the first opening and the second opening, respectively, of the raised ridge;

selecting a second tooth on the first vertical rod and a second tooth on the second vertical rod;

reinserting the first vertical rod through the first opening of the raised ridge and reinserting the second vertical rod through the second opening of the raised ridge;

pushing the second tooth of the first vertical rod and the second tooth of the second vertical rod against the bottom edge of the raised ridge of the keel adapter assembly until a desired height is achieved.

16. The method of claim 15, wherein the floating waterfowl decoy remains positioned within the keel adapter assembly as coupled to the keel trench while selectively adjusting the height of the keel adapter assembly.

17. The method of claim 14, wherein the keel front side of the floating waterfowl decoy is positioned ahead of or behind a front side of the keel trench, wherein the front side of the keel trench is open.

18. The method of claim 14, wherein the keel back side of the floating waterfowl decoy contacts or is positioned proximate to an interior facing surface of the raised ridge of the keel trench.

19. The method of claim 14, wherein the keel adapter assembly and the keel trench are configured to receive different floating waterfowl decoys having different sizes and shapes for the keel body, the keel front side, and/or the keel back side.

20. The method of claim 14, further comprising, stacking multiple keel trenches together for storage purposes, wherein a set of prongs of a first keel trench are insertable into cutouts formed in a top side of a lower trench surface of a second keel trench.

* * * * *